United States Patent
Yabe et al.

(10) Patent No.: US 8,479,359 B2
(45) Date of Patent: Jul. 9, 2013

(54) HINGE DEVICE, METHOD OF REDIRECTING LOAD APPLIED TO HINGE DEVICE, AND MOBILE TERMINAL APPARATUS

(75) Inventors: Osamu Yabe, Tokyo (JP); Yuichi Yamada, Tokyo (JP); Tomoyuki Sonoda, Tokyo (JP)

(73) Assignees: Sony Corporation, Tokyo (JP); Sony Mobile Communications, Inc., Tokyo (JP)

( * ) Notice: Subject to any disclaimer, the term of this patent is extended or adjusted under 35 U.S.C. 154(b) by 303 days.

(21) Appl. No.: 12/431,257

(22) Filed: Apr. 28, 2009

(65) Prior Publication Data

US 2009/0293231 A1 Dec. 3, 2009

(30) Foreign Application Priority Data

Jun. 2, 2008 (JP) ................................. 2008-144692

(51) Int. Cl.
*E05D 11/06* (2006.01)
(52) U.S. Cl.
USPC ........................................................ 16/376
(58) Field of Classification Search
USPC ............. 16/376, 328–30, 303, 367, 362–363, 16/374, 340–342
See application file for complete search history.

(56) References Cited

U.S. PATENT DOCUMENTS

| | | | | |
|---|---|---|---|---|
| 5,996,178 A * | 12/1999 | Murray | | 16/303 |
| 6,033,015 A * | 3/2000 | Husted | | 297/188.19 |
| 6,983,514 B2 * | 1/2006 | Lu et al. | | 16/342 |
| 7,007,345 B2 * | 3/2006 | Nakase et al. | | 16/330 |
| 7,509,709 B2 * | 3/2009 | Chung | | 16/330 |
| 2009/0199364 A1 * | 8/2009 | Patterson | | 16/297 |

FOREIGN PATENT DOCUMENTS

| | | |
|---|---|---|
| JP | 2001-103137 A | 4/2001 |
| JP | 2004-183698 A | 7/2004 |
| JP | 2004-278659 A | 10/2004 |
| JP | 2006-118178 | 5/2006 |

OTHER PUBLICATIONS

Japanese Office Action issued Nov. 6, 2012 in Patent Application No. 2008-144692.

* cited by examiner

*Primary Examiner* — Victor Batson
*Assistant Examiner* — Matthew Sullivan
(74) *Attorney, Agent, or Firm* — Oblon, Spivak, McClelland, Maier & Neustadt, L.L.P.

(57) ABSTRACT

A hinge device includes a first frame member having a securing section at which the first frame member is secured to a first body, a rotation shaft supporting the first frame member allowing rotation thereof, a stopper provided on the first frame member in such a manner as to project in a direction in which the rotation shaft extends and to rotate together with the first frame member about the rotation shaft, and a second frame member. The second frame member having a securing section at which the second frame member is secured to a second body, a rotation-shaft-supporting section supporting the rotation shaft, and a stopper-receiving portion receiving the stopper. The stopper and the stopper-receiving portion are subjected to load-redirecting processing such that a load produced upon contact between the stopper and the stopper-receiving portion is applied in such a direction that a thickness of the stopper becomes larger.

12 Claims, 22 Drawing Sheets

HINGE DEVICE, METHOD OF REDIRECTING LOAD APPLIED TO HINGE DEVICE, AND MOBILE TERMINAL APPARATUS

BACKGROUND OF THE INVENTION

1. Field of the Invention

The present invention relates to hinge devices suitable for application to apparatuses, such as a mobile phone, a personal handyphone system (PHS), a personal digital assistant (PDA), a portable game machine, and a notebook personal computer, each including two bodies connected to each other with a hinge so as to be openable and foldable together, and also relates to methods of redirecting loads applied to the hinge devices, and to mobile terminal apparatuses.

In particular, the present invention relates to a hinge device including a stopper and a stopper-receiving portion that are configured such that a load produced upon contact therebetween when the two bodies are opened is redirected in such a direction that the thickness of the stopper becomes larger, whereby the strength of the hinge device is increased, and also relates to a method of redirecting the load applied to the hinge device, and to a mobile terminal apparatus.

2. Description of the Related Art

Nowadays, foldable mobile phones are gaining popularity. A typical foldable mobile phone includes an upper body and a lower body that are connected to each other with a hinge device and are thus openable and foldable together. There are some cases where a hinge device enabling the upper body and the lower body to be opened and folded together is integrally provided with the two bodies. Such a hinge device, provided as a portion of the two bodies in terms of design and shape, may limit the designs and shapes of the upper and lower bodies.

Therefore, most of the recent mobile phones employ a so-called "frame hinge device", which is provided separately from the upper body and the lower body. With the frame hinge device, which is a separate body from the upper and lower bodies, the shapes of the upper and lower bodies can be designed substantially freely and with more ease.

The frame hinge device includes a first hinge member and a second hinge member. The first hinge member is secured to the upper body, and the second hinge member is secured to the lower body, whereby the upper and lower bodies are openable and foldable together. In a case where the rotation angle formed between the upper body and the lower body is regulated to be the maximum at a point at which the upper body and the lower body come into contact with each other when opened, respective contact portions of the upper body and the lower body are easily damaged. Therefore, the frame hinge device includes a stopper so that the rotation angle formed between the upper body and the lower body is regulated to be the maximum immediately before the upper body and the lower body, when opened, come into contact with each other. Such a stopper is easily damaged by, for example, an impact caused by dropping the phone and excessive opening of the phone. Therefore, in a product development process, developers make special efforts to provide sufficient strength to the stopper.

Japanese Unexamined Patent Application Publication No. 2006-118178 discloses a biaxial hinge that is not easily damaged and whose stopper is prevented from coming off a turning-movement shaft even if the sizes of the turning-movement shaft and the stopper are reduced. In this biaxial hinge, the stopper and the turning-movement shaft are formed as an integral body, and the turning-movement shaft included in the integral body is attached to an opening/closing-movement shaft. The turning-movement shaft is prevented from turning beyond the critical angle by causing a projection provided on the stopper to be locked by a locking portion of the opening/closing-movement shaft.

Since the turning-movement shaft and the stopper are provided as an integral body, sufficient strength can be provided to the stopper and the joint between the stopper and the turning-movement shaft. In addition, coming off of the stopper and damage to the stopper can be prevented from occurring while the turning-movement shaft is turned.

SUMMARY OF THE INVENTION

Bodies of earlier mobile phones are large, and therefore hinges thereof are also large, with large stoppers assuredly providing sufficient strength. However, recent mobile phones have smaller sizes and smaller thicknesses, and naturally hinge devices thereof are provided in smaller sizes. A hinge device of a small size has a small shaft diameter. Therefore, according to the principle of leverage, a force applied to the stopper when the upper and lower bodies are rotated increases, leading to a problem in that the stopper may be damaged easily.

FIGS. 22A and 22B show an example of such a case. When an upper body and a lower body are opened to a predetermined rotation angle of, for example, 170 degrees, a stopper 100 of a first hinge member secured to the upper body comes into contact with a stopper 101 of a second hinge member secured to the lower body. Thus, the rotation angle formed between the upper and lower bodies is regulated to be the maximum at the predetermined angle of, for example, 170 degrees.

The stopper 100 of the first hinge member and the stopper 101 of the second hinge member are configured such that the stopper 101 of the second hinge member vertically comes into contact with and supports the stopper 100 of the first hinge member. Therefore, when the stopper 100 of the first hinge member comes into contact with the stopper 101 of the second hinge member, a force is applied to the stopper 100 of the first hinge member in directions indicated by dashed arrows shown in FIGS. 22A and 22B, i.e., the direction in which the stopper 101 comes into contact with the stopper 100. The force in such a direction significantly affects a corner 100c of the stopper 100 of the first hinge member shown in FIGS. 22A and 22B, that is, a large load is applied to the corner 100c. Therefore, if some large force is applied to the hinge device because of, for example, an impact caused by dropping the phone or excessive opening of the phone, the stopper 100 of the first hinge member may be damaged from the corner 100c thereof.

To prevent such a problem causing damage to the hinge device, a large stopper may alternatively be used. However, use of a large stopper naturally increases the size of the hinge device, against the trend of recent mobile phones having smaller sizes and smaller thicknesses.

The same applies to the biaxial hinge disclosed in Japanese Unexamined Patent Application Publication No. 2006-118178. Since the locking portion of the opening/closing-movement shaft vertically supports the projection of the stopper integrally provided with the turning-movement shaft, when a large force is applied to the hinge, the locking portion may be damaged. If the locking portion and the stopper are made of metal, the strength thereof can be increased. However, use of metal members unpreferably increases the manufacturing cost of the hinge and makes short-time mass production thereof difficult.

In light of the above, it is desirable that the present invention provide a hinge device that can be manufactured with low cost from materials suitable for mass production and have strength sufficient for preventing damage to a stopper occurring when a large force is applied thereto even if the size of the hinge device is reduced, and also provide a method of redirecting the load applied to the hinge device, and a mobile terminal apparatus.

According to an embodiment of the present invention, a hinge device includes a first frame member having a securing section at which the first frame member is secured to a first body, a rotation shaft supporting the first frame member allowing rotation thereof, a stopper provided on the first frame member in such a manner as to project in a direction in which the rotation shaft extends and to rotate together with the first frame member about the rotation shaft, and a second frame member. The second frame member has a securing section at which the second frame member is secured to a second body, a rotation-shaft-supporting section supporting the rotation shaft, and a stopper-receiving portion receiving the stopper.

The stopper and the stopper-receiving portion are subjected to load-redirecting processing such that a load produced upon contact between the stopper and the stopper-receiving portion is applied in such a direction that a thickness of the stopper becomes larger.

According to the embodiment, a load produced upon contact between the stopper and the stopper-receiving portion can be redirected in such a direction that the thickness of the stopper becomes larger. Therefore, the stopper can be prevented from being damaged by the aforementioned load.

In addition, since the stopper can have sufficient strength, the hinge device can be manufactured from inexpensive materials suitable for mass production and have strength sufficient for preventing the stopper from being damaged because of an impact caused by dropping an apparatus including the hinge device and excessive opening of the apparatus even if the size of the hinge device is reduced.

DESCRIPTION OF THE PREFERRED EMBODIMENTS

Figure 1:
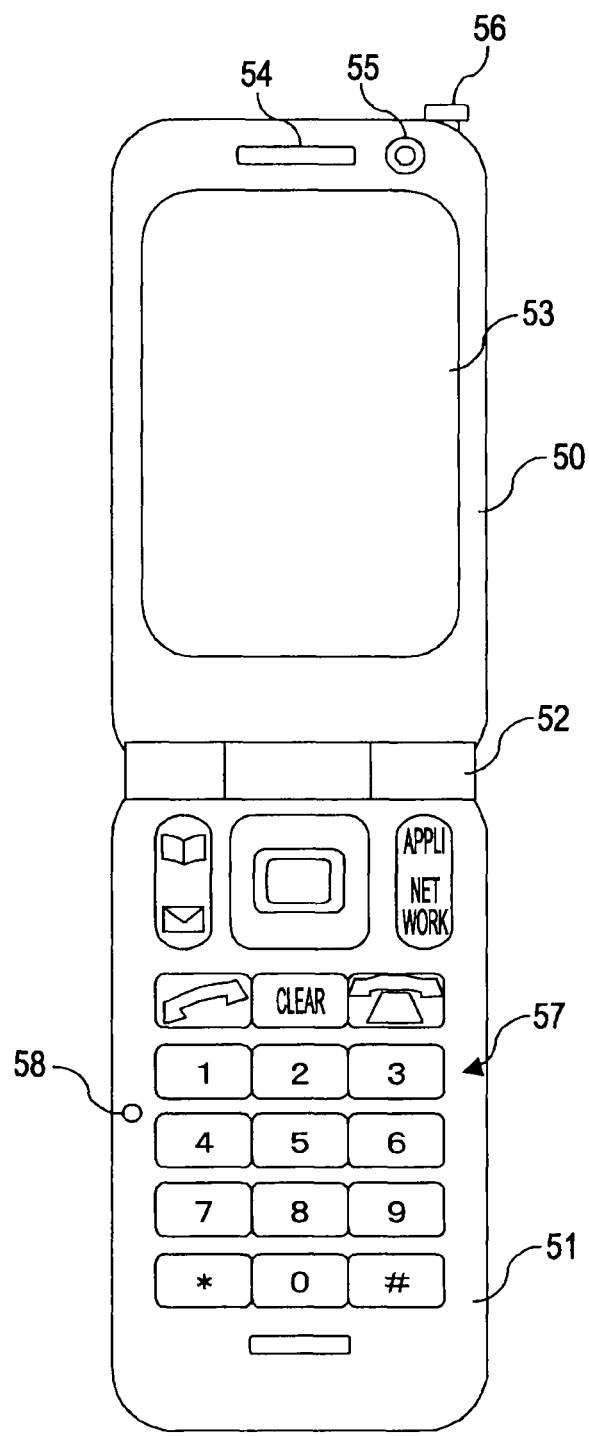
FIG. 1 is a front view of a mobile phone, in an open state, according to an embodiment of the present invention.

Embodiments of the present invention will now be described with reference to the accompanying drawings. The present invention can be applied to a foldable mobile phone.
Configuration of Mobile phone FIG. 1 is a front view of a mobile phone, in an open state, according to an embodiment of the present invention. As can be seen from FIG. 1, the mobile phone of the embodiment includes a substantially rectangular upper body 50 and a substantially rectangular lower body 51 having substantially the same size as the upper body 50. One short-side end of the upper body 50 and one short-side end of the lower body 51 are connected to each other with a hinge device 52 interposed therebetween, whereby the upper body 50 and the lower body 51 can be folded together (closed) and opened.

The upper body 50 is provided with a main display unit 53 including a liquid crystal display or the like, a speaker unit 54 configured to output audio that is received, a so-called self-shooting camera unit 55 configured to shoot an image of a user of the mobile phone when, for example, a videophone function is used, and a television antenna 56 configured to receive television broadcast. The upper body 50 is also provided with a sub-display unit (not shown), having a small display screen, on the side opposite the side having the main display unit 53.

Figure 2:
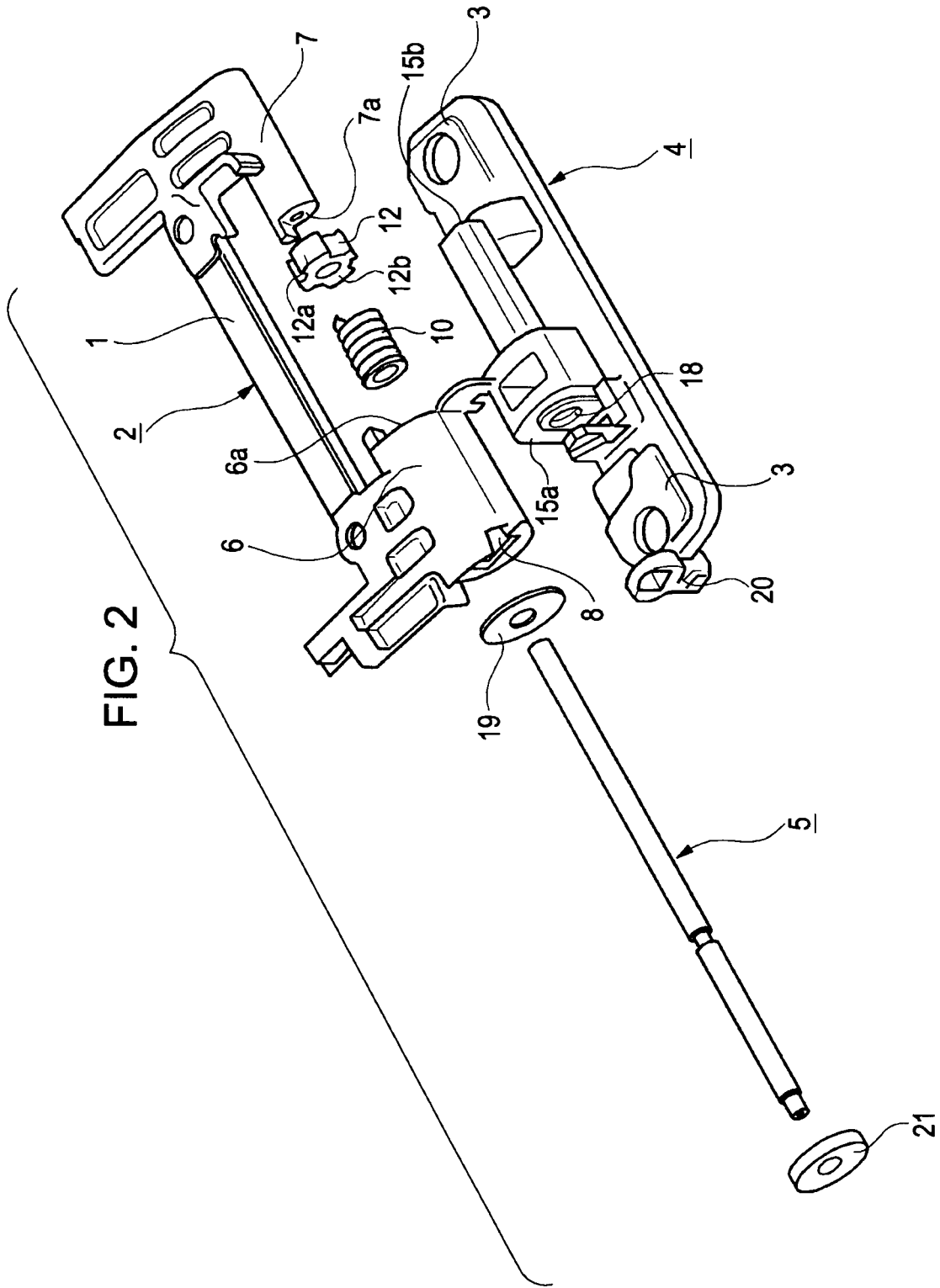
FIG. 2 is an exploded perspective view of a hinge device included in the mobile phone according to the embodiment.

The lower body 51 is provided with a key operation unit 57 including various operation keys such as a directional key pad, number keys, an on-hook key, an off-hook key, and so forth, and a microphone unit 58 configured to collect audio to be sent. The lower body 51 is also provided with a camera unit (not shown) configured to shoot an image of a desired object and a stereo speaker unit (not shown) for external output, on the side opposite the side having the key operation unit 57.
Configuration of Hinge Device FIG. 2 is an exploded perspective view of the hinge device 52 included in the mobile phone according to the embodiment of the present invention. As can be seen from FIG. 2, the hinge device 52 according to the embodiment includes a first frame member 2 having a securing section 1 in which screw holes are provided for screwing the first frame member 2 to the upper body 50 of the mobile phone, a second frame member 4 having a securing section 3 at which the second frame member 4 is screwed to the lower body 51 of the mobile phone, and a shaft member 5 having a substantially cylindrical stick-like shape and serving as a rotational axis about which the first and second frame members 2 and 4 rotate.

The first and second frame members 2 and 4 are made of curable plastic material such as acrylonitrile butadiene styrene (ABS) resin. The shaft member 5 is made of metal material such as aluminum or iron.

Configuration of First Frame Member

Figure 3:
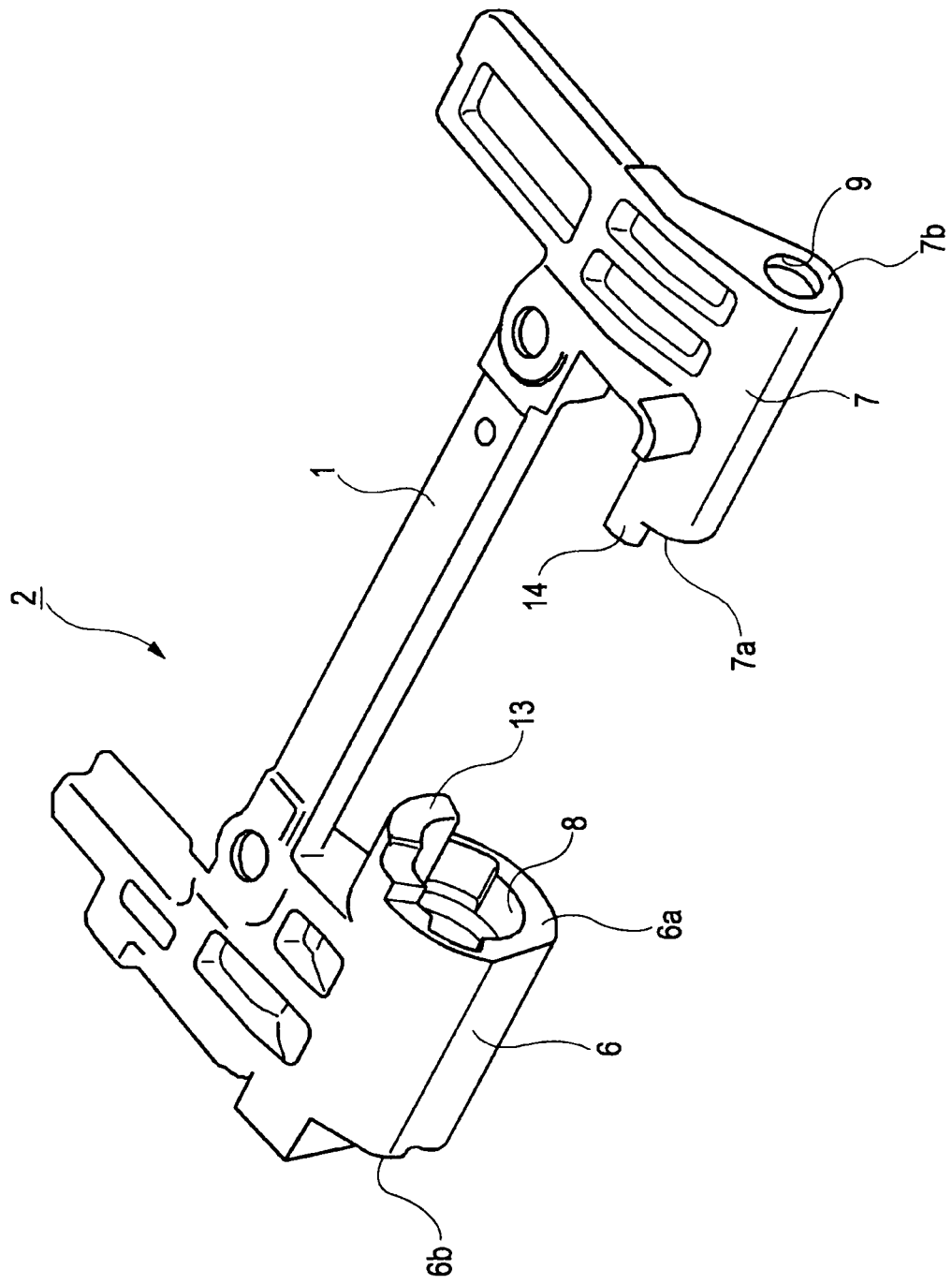
FIG. 3 is a perspective view of a first frame member included in the hinge device.
Figure 4:
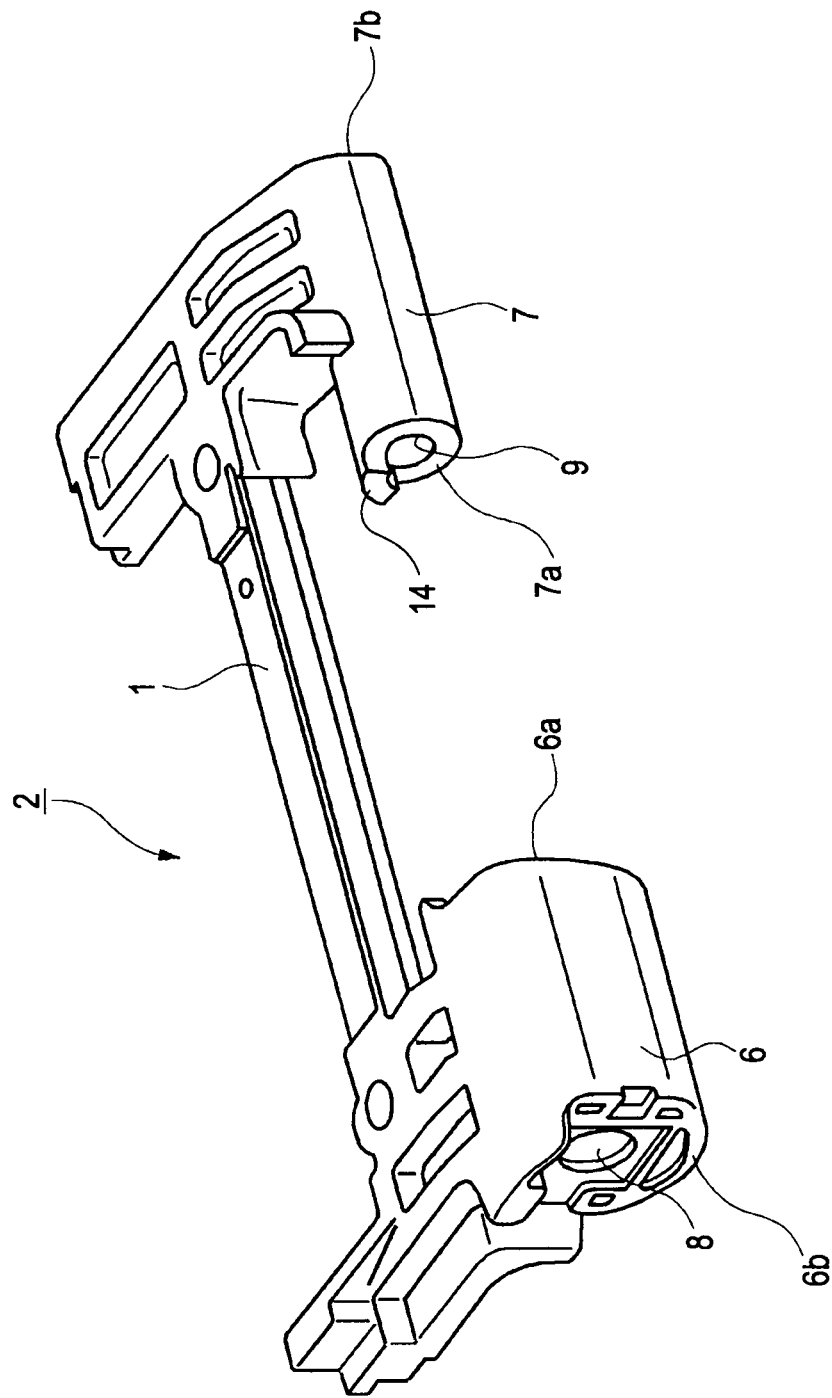
FIG. 4 is another perspective view of the first frame member included in the hinge device.

FIGS. 3 and 4 are perspective views of the first frame member 2. As can be seen from FIGS. 3 and 4, the first frame member 2 includes a first shaft-insertion section 6 and a second shaft-insertion section 7 that have substantially cylindrical shapes and whose respective one-end surface 6a and one-end surface 7a face each other with the securing section 1 interposed therebetween. The first and second shaft-insertion sections 6 and 7 have shaft-insertion holes 8 and 9, respectively, passing from the respective centers of the one-end surfaces 6a and 7a through to the respective centers of the other-end surfaces 6b and 7b. By inserting the shaft member 5 into the shaft-insertion holes 8 and 9, the first frame member 2 (and the upper body 50 secured thereto) is supported in such a manner as to be rotatable about the shaft member 5, i.e., the rotational axis.

Figure 5:
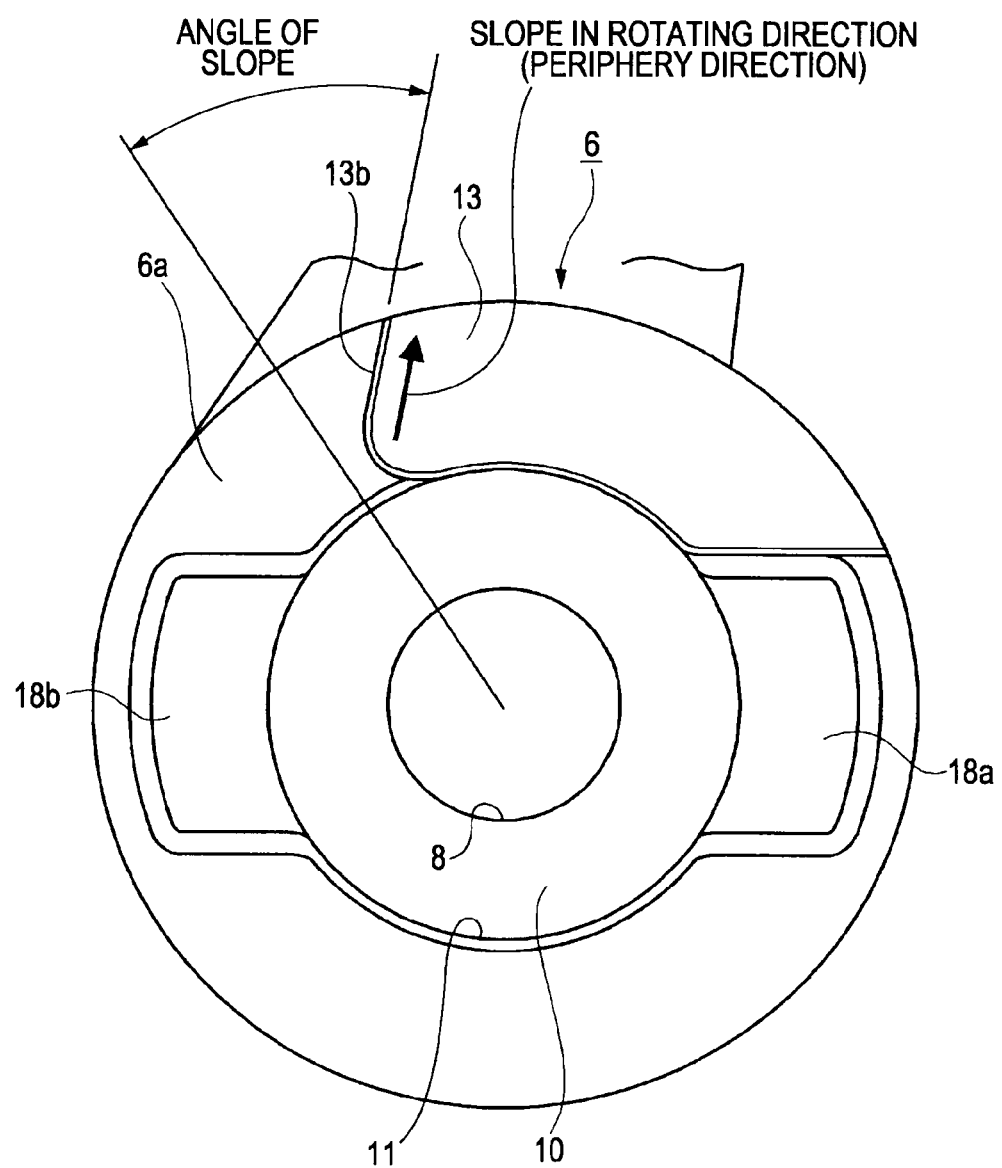
FIG. 5 is a diagram showing a one-end surface of a first shaft-insertion section included in the first frame member.

FIG. 5 is a front view of the one-end surface 6a of the first shaft-insertion section 6. As can be seen from FIG. 5, the first shaft-insertion section 6 has therein a spring-receiving portion 11 that receives a spring 10 shown in FIG. 2. Therefore, the diameter of the first shaft-insertion section 6 is larger than that of the second shaft-insertion section 7.

Figure 6:
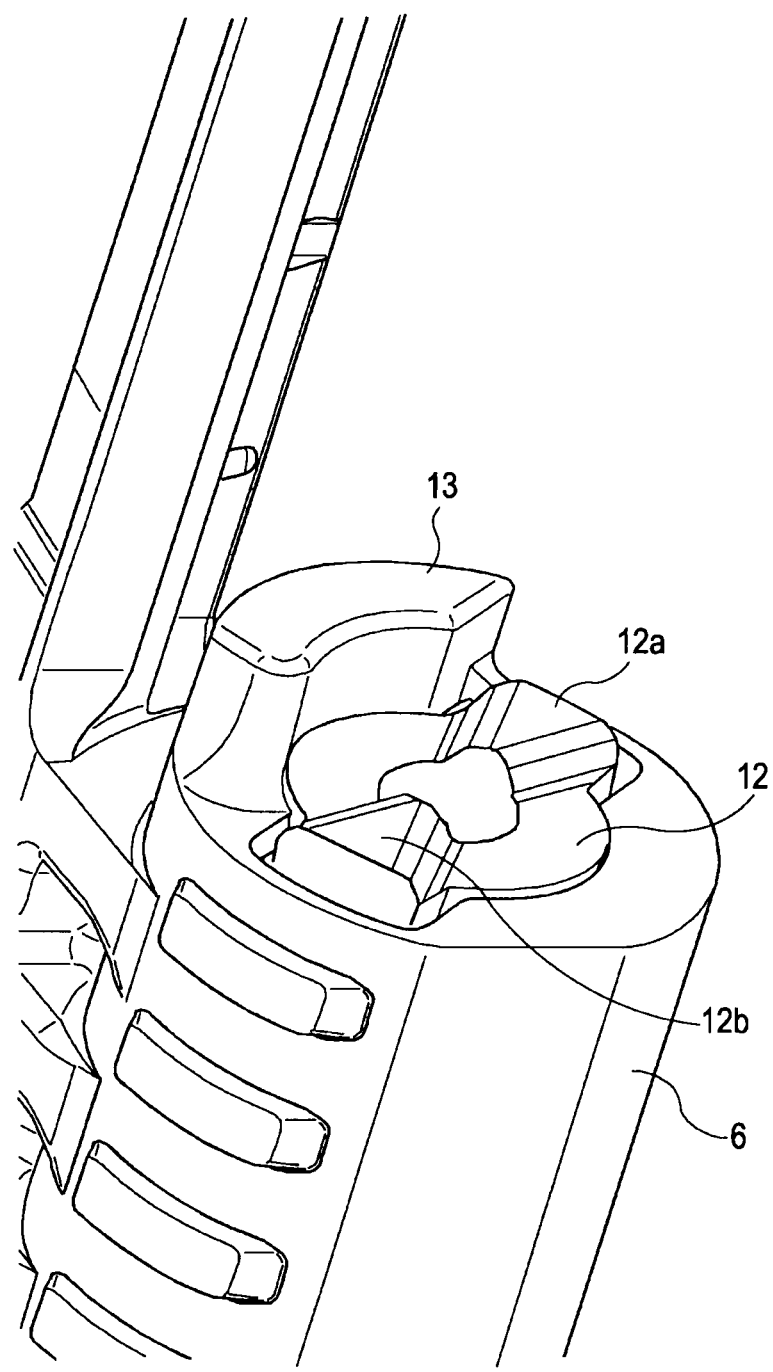
FIG. 6 is a perspective view of the first shaft-insertion section, seen from the side of the one-end surface, with a cam member fitted thereto.

The one-end surface 6a of the first shaft-insertion section 6 has a pair of recesses 18a and 18b on opposite sides of the shaft-insertion hole 8. Referring to FIG. 6, a pair of projections 12a and 12b provided on a cam member 12, which is urged by the spring 10, are to be fitted into and secured by the recesses 18a and 18b, respectively.

Figure 7:
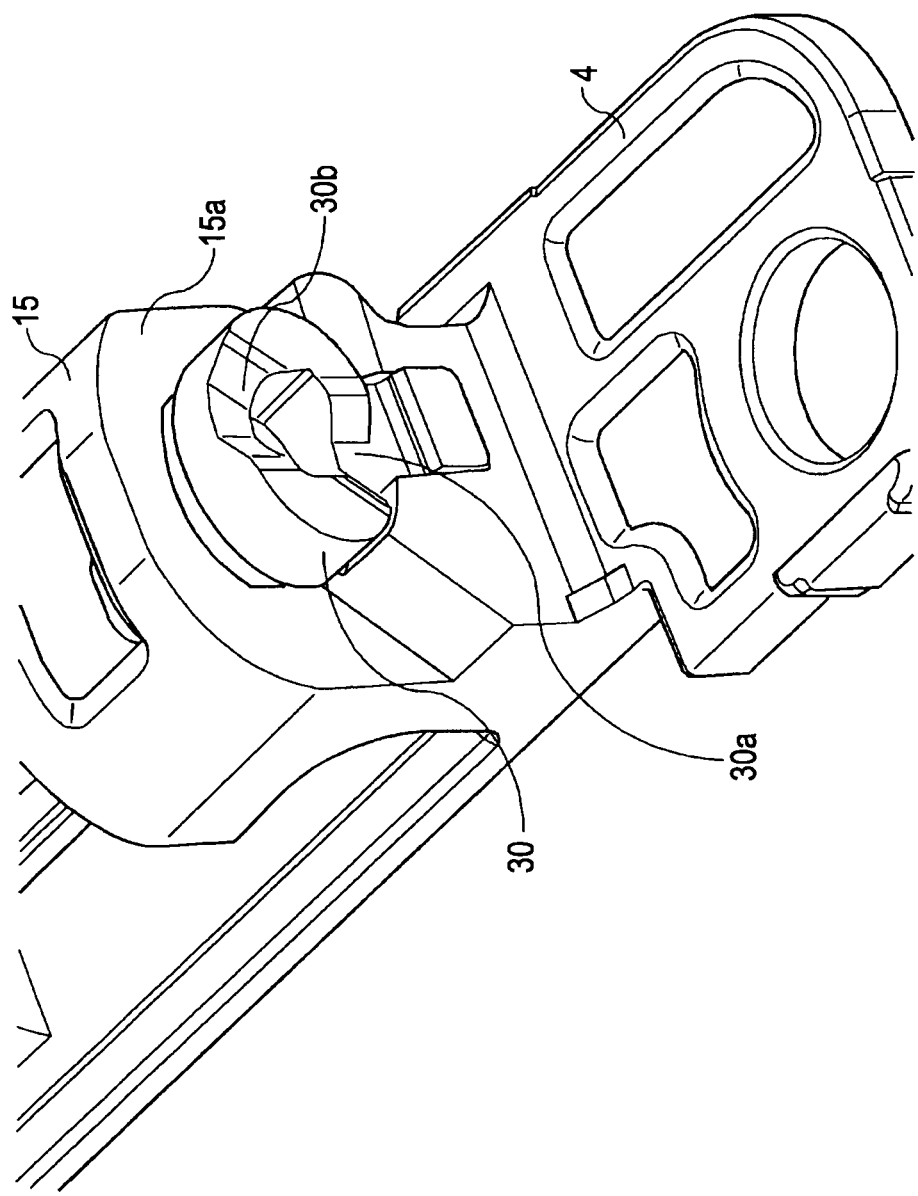
FIG. 7 is a perspective view of another cam member provided on a rotation support section and to which the cam member provided on the first shaft-insertion section is fitted.

Referring to FIG. 7, the projections 12a and 12b of the cam member 12 are to be fitted into recesses 30a and 30b, respectively, of a cam member 30 secured at one end 15a of a rotation-shaft-supporting section 15 of the second frame member 4. In accordance with the rotation angle formed between the first frame member 2 and the second frame member 4, that is, in accordance with the opening/closing movement of the upper body 50 and the lower body 51, the projections 12a and 12b of the cam member 12 shown in FIG. 6 fall into or come out of the recesses 30a and 30b of the cam member 30 shown in FIG. 7, whereby tactile clicking sensation is provided.

Referring to FIG. 3, the first shaft-insertion section 6 has on the one-end surface 6a thereof a first stopper 13 projecting in a direction in which the shaft member 5, serving as the rotational axis, extends. The first stopper 13 has a thickness ranging from the outer periphery of the first shaft-insertion section 6 to the periphery of the shaft-insertion hole 8, and extends on the one-end surface 6a with a length of about ¼ of the circumference of the first shaft-insertion section 6.

Figure 8:
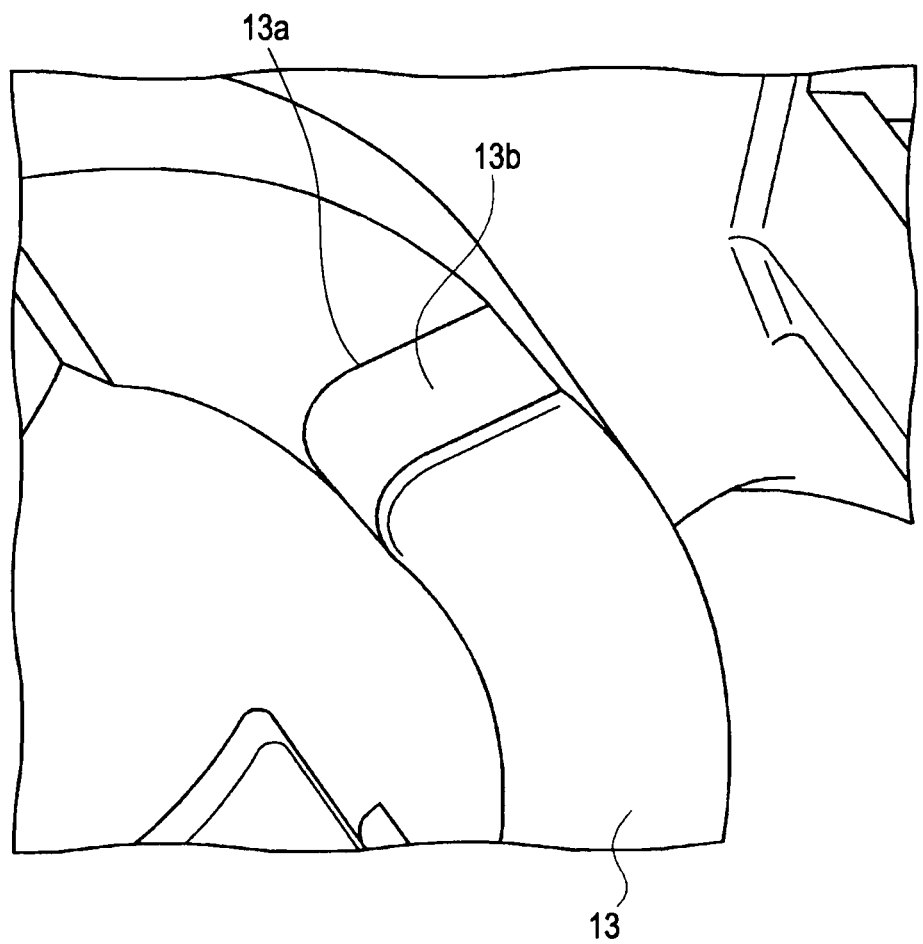
FIG. 8 is an enlarged view of a first stopper provided on the first shaft-insertion section of the first frame member.
Figure 9:
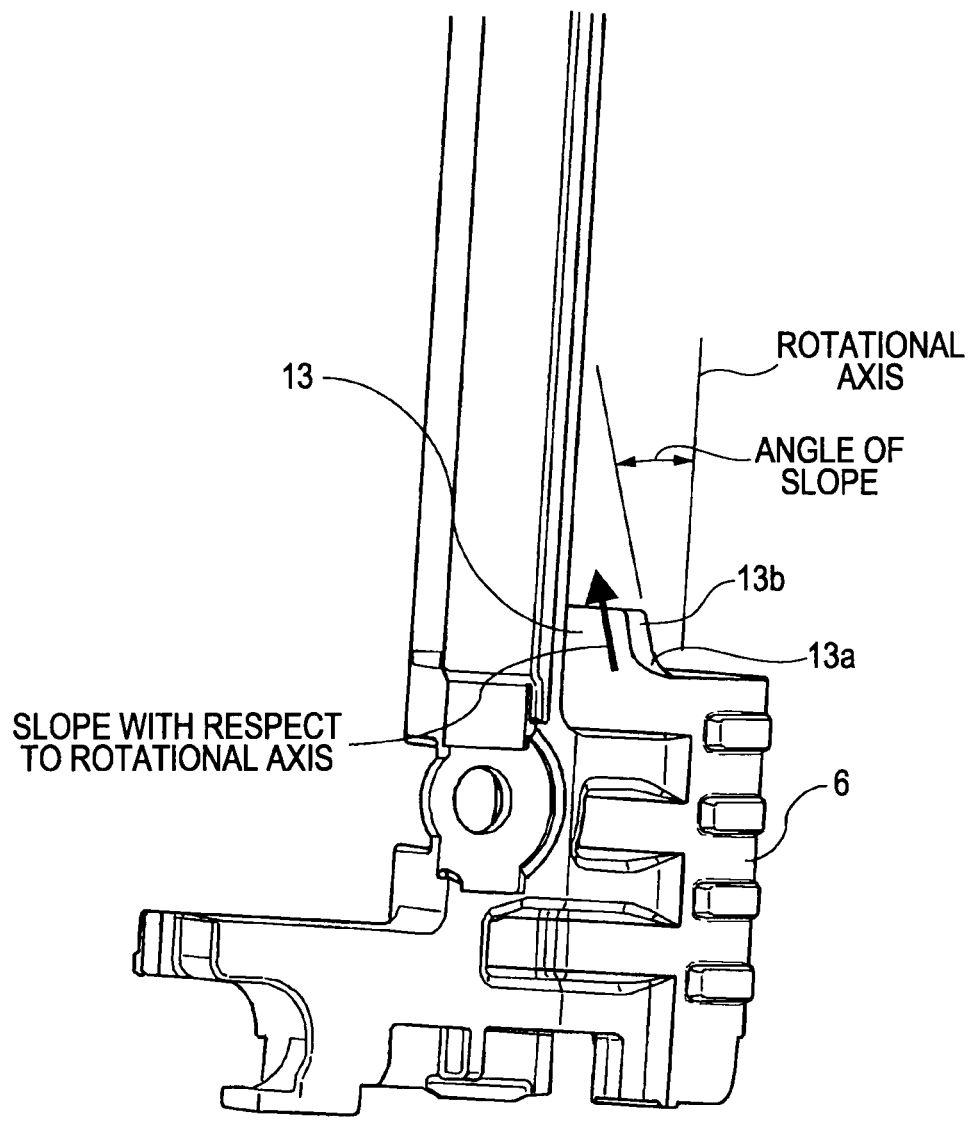
FIG. 9 is a perspective view for describing how the first stopper is made to slope.
Figure 10:
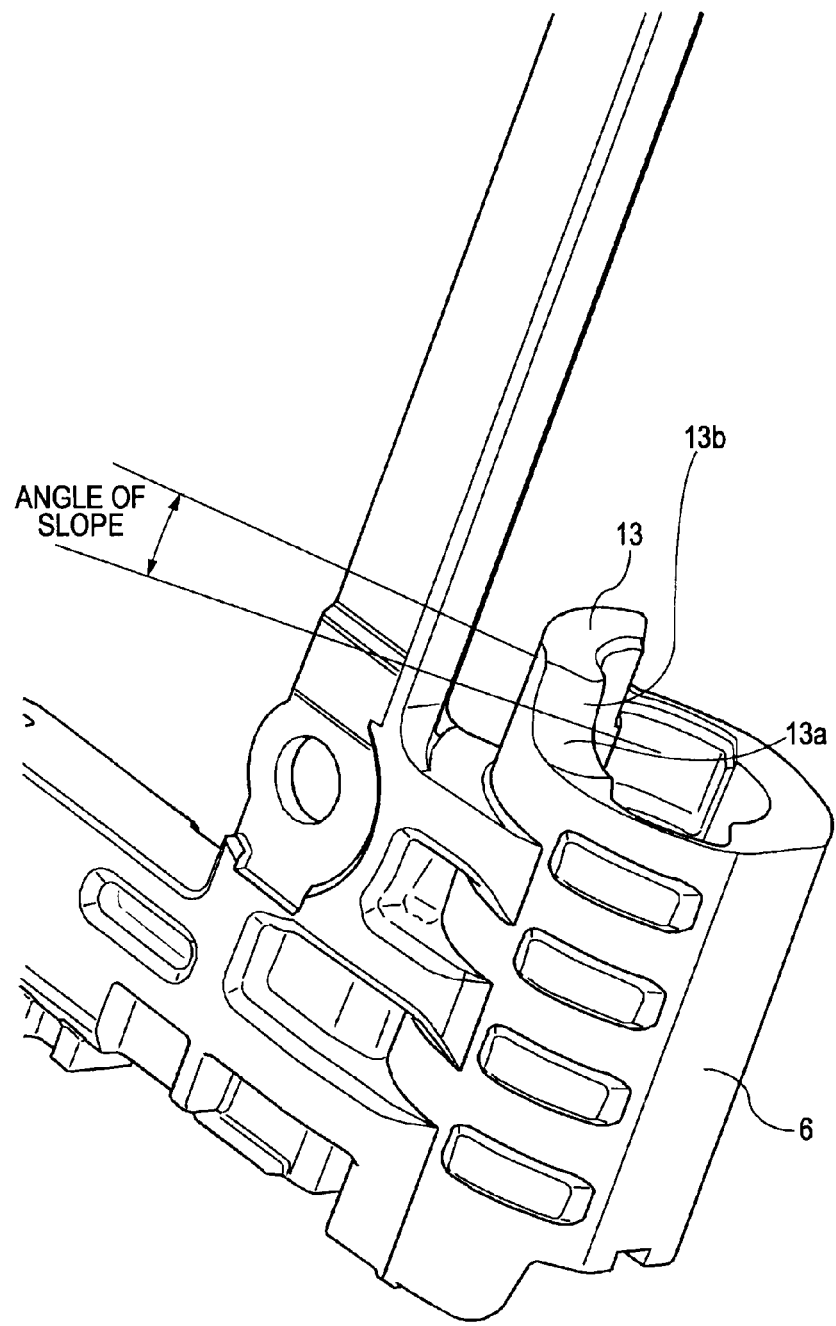
FIG. 10 is a perspective view for describing a radius given to a junction between the first stopper and the first shaft-insertion section.
Figure 11:
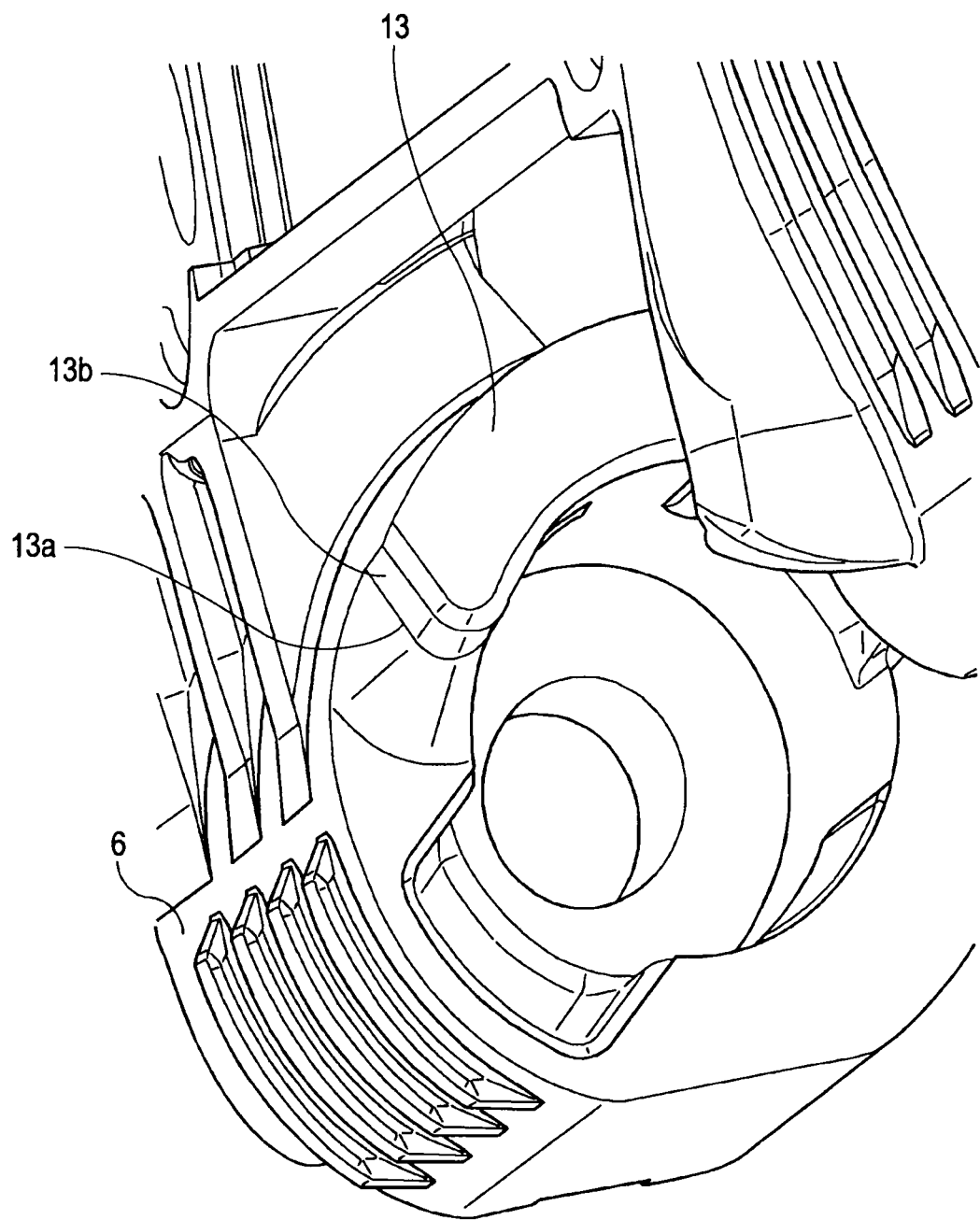
FIG. 11 is an enlarged perspective view of the first stopper provided on the first shaft-insertion section of the first frame member.

FIG. 8 is an enlarged view of the first stopper 13. FIGS. 9 to 11 are perspective views of the first shaft-insertion section 6. As can be seen from FIGS. 8 to 11, a junction corner 13a, which is a corner (junction) between the first stopper 13 and the first shaft-insertion section 6, is given a radius such that the first stopper 13 and the first shaft-insertion section 6 are connected with a predetermined curve, not with a sharp turn, therebetween.

The first stopper 13 has a contact surface 13b that is to be in contact with a first-stopper-receiving portion 16 (shown in FIG. 17), which will be described below. The contact surface 13b is made to slope at an angle in the direction of the periphery of the first stopper 13, as shown in FIG. 5, and at a predetermined angle with respect to the rotational axis, as shown in FIG. 9.

Specifically, such sloping of the contact surface 13b of the first stopper 13 is intended to redirect a load produced upon contact between the first stopper 13 of the first shaft-insertion section 6 and the first-stopper-receiving portion 16 (see FIG. 17), in such a direction that the thickness of the first-stopper-receiving portion 16 becomes larger. In other words, the contact surface 13b of the first stopper 13 is made to slope such that a load produced upon contact between the first stopper 13 of the first shaft-insertion section 6 and the first-stopper-receiving portion 16 is applied to the first-stopper-receiving portion 16 in such a direction that the thickness of the first-stopper-receiving portion 16 becomes larger.

The second shaft-insertion section 7 has on the one-end surface 7a thereof a second stopper 14, having substantially the same configuration as the first stopper 13 on the one-end surface 6a of the first shaft-insertion section 6. Referring to FIG. 4, the second stopper 14 projects in the direction in which the shaft member 5, serving as the rotational axis, extends. The second stopper 14 has a thickness ranging from the outer periphery of the second shaft-insertion section 7 to the periphery of the shaft-insertion hole 9, and extends on the one-end surface 7a with a length of about ¼ of the circumference of the second shaft-insertion section 7.

Figure 12:
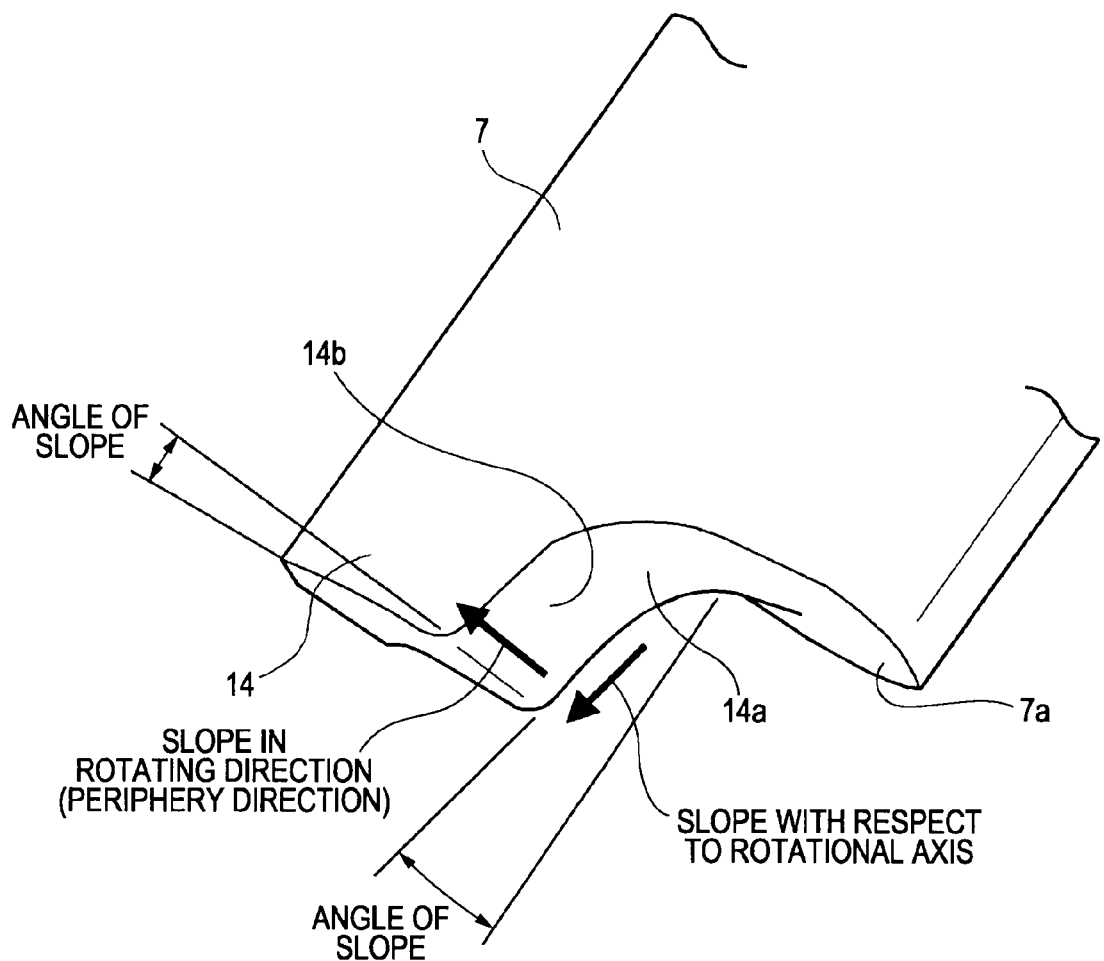
FIG. 12 is an enlarged view of a second stopper provided on a second shaft-insertion section of the first frame member.
Figure 13:
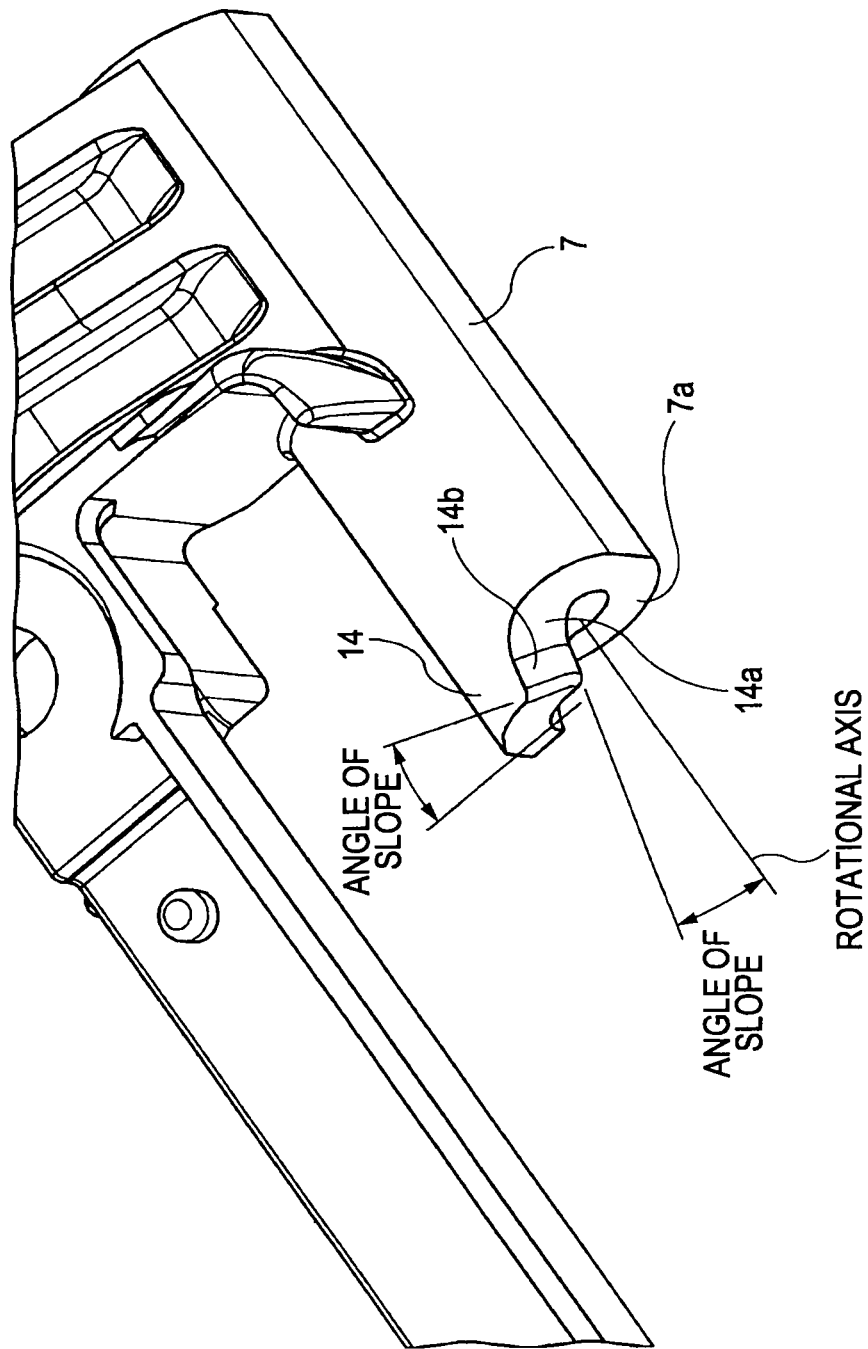
FIG. 13 is a perspective view for describing how the second stopper is made to slope.

FIG. 12 is an enlarged view of the second stopper 14. FIG. 13 is a perspective view of the second stopper 14. As can be seen from FIGS. 12 and 13, a junction corner 14a, which is a corner (junction) between the second stopper 14 and the second shaft-insertion section 7, is given a radius such that the second stopper 14 and the second shaft-insertion section 7 are connected with a predetermined curve, not with a sharp turn, therebetween.

The second stopper 14 has a contact surface 14b that is to be in contact with a second-stopper-receiving portion 17 (shown in FIG. 18), which will be described below. Referring to FIG. 12, the contact surface 14b is made to slope at an angle in the direction of the periphery of the second stopper 14 and at a predetermined angle with respect to the rotational axis.

Specifically, such sloping of the contact surface 14b of the second stopper 14 is intended to redirect a load produced upon contact between the second stopper 14 of the second shaft-insertion section 7 and the second-stopper-receiving portion 17 (see FIG. 18), in such a direction that the thickness of the second-stopper-receiving portion 17 becomes larger. In other words, the contact surface 14b of the second stopper 14 is made to slope such that a load produced upon contact between the second stopper 14 of the second shaft-insertion section 7 and the second-stopper-receiving portion 17 is applied to the second-stopper-receiving portion 17 in such a direction that the thickness of the second-stopper-receiving portion 17 becomes larger.

Configuration of Second Frame Member

Figure 14:
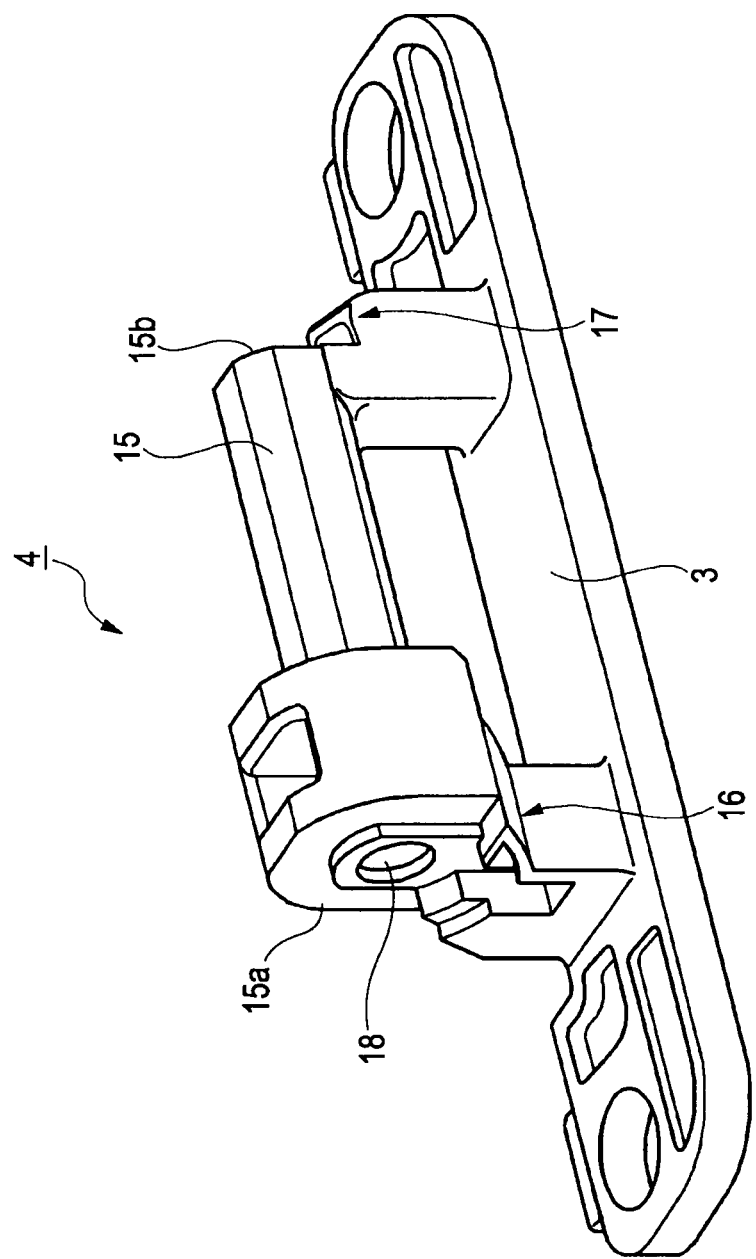
FIG. 14 is a perspective view of a second frame member included in the hinge device.
Figure 15:
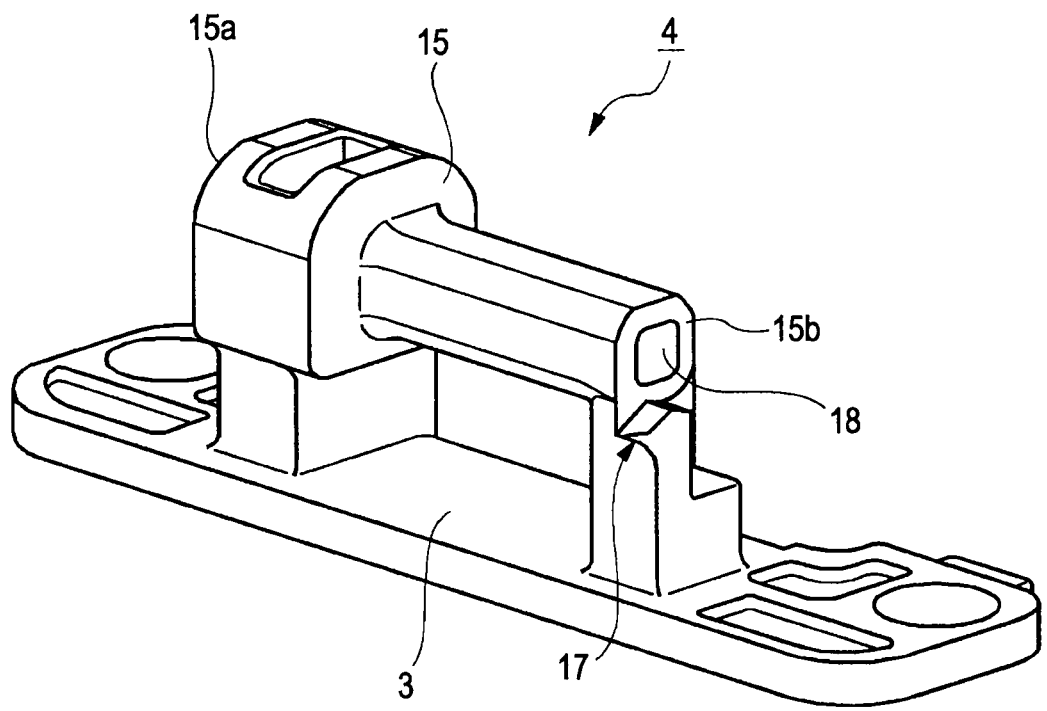
FIG. 15 is another perspective view of the second frame member included in the hinge device.

FIGS. 14 and 15 are perspective views of the second frame member 4. As can be seen from FIGS. 14 and 15, the second frame member 4 includes the rotation-shaft-supporting section 15 having substantially a cylindrical shape and configured to support the shaft member 5, the first-stopper-receiving portion 16 provided near the one end 15a of the rotation-shaft-supporting section 15, and the second-stopper-receiving portion 17 provided near the other end 15b of the rotation-shaft-supporting section 15. The rotation-shaft-supporting section 15, the first-stopper-receiving portion 16, and the second-stopper-receiving portion 17 are made of curable plastic material, such as ABS resin, and are integrally molded with the securing section 3.

The rotation-shaft-supporting section 15 has a shaft-insertion hole 18 passing from the one end 15a through to the other end 15b. The rotation-shaft-supporting section 15 supports the shaft member 5, serving as the rotational axis, inserted into the shaft-insertion hole 18.

Figure 16:
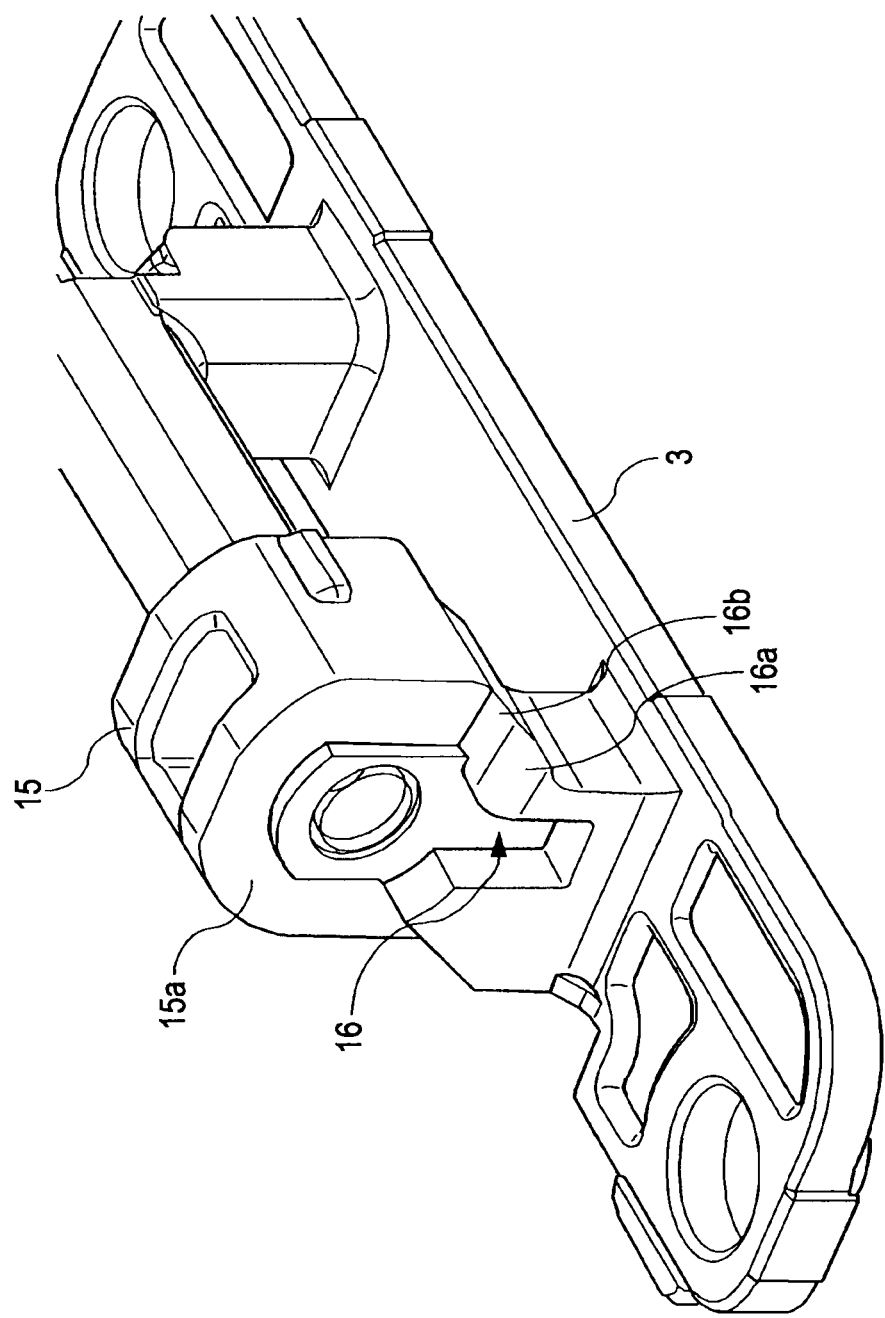
FIG. 16 is a diagram for describing a first-stopper-receiving portion provided on the second frame member.
Figure 17:
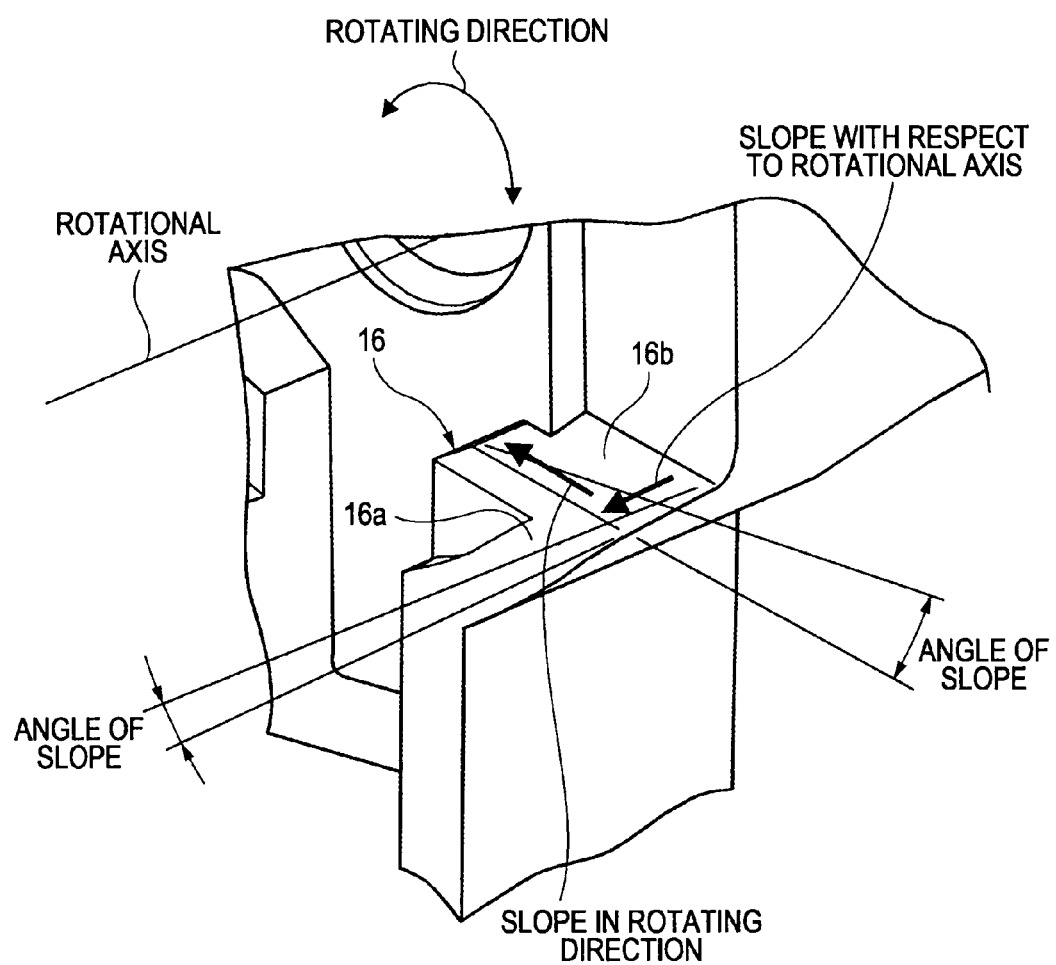
FIG. 17 is an enlarged view of the first-stopper-receiving portion provided on the second frame member.

FIG. 16 is a perspective view of the first-stopper-receiving portion 16. FIG. 17 is an enlarged view of the first-stopper-receiving portion 16. As can be seen from FIGS. 16 and 17, an edge 16a of the first-stopper-receiving portion 16 is given such a radius as to form a predetermined curve. The radius given to the edge 16a of the first-stopper-receiving portion 16 corresponds to the radius given to the junction corner 13a of the first stopper 13. Therefore, the first stopper 13 and the first-stopper-receiving portion 16 are to be in contact with each other at the junction corner 13a and the edge 16a forming curves.

The first-stopper-receiving portion 16 has a contact surface 16b that is to be in contact with the contact surface 13b of the first stopper 13 shown in FIGS. 9 and 10. Referring to FIG. 17, the contact surface 16b is cut obliquely such that an end thereof near the edge 16a resides lower than the opposite end thereof away from the edge 16a, whereby the contact surface 16b is made to slope at an angle with respect to the rotational axis.

In addition to such a slope with respect to the rotational axis, the contact surface 16b of the first-stopper-receiving portion 16 is made to slope at another angle in the rotating direction of the rotational axis, as shown in FIG. 17. Specifically, the contact surface 16b is made to slope such that an end thereof near the rotational axis resides lower than the opposite end thereof away from the rotational axis.

That is, to redirect a load produced upon contact between the first stopper 13 of the first shaft-insertion section 6 and the contact surface 16b of the first-stopper-receiving portion 16 in such a direction that the thickness of the first shaft-insertion section 6 becomes larger, the contact surface 16b is made to slope at an angle with respect to the rotational axis and at another angle in the rotating direction. In short, the contact surface 16b of the first-stopper-receiving portion 16 is made to slope such that a load produced upon contact between the first stopper 13 of the first shaft-insertion section 6 and the contact surface 16b is applied in such a direction that the thickness of the first shaft-insertion section 6 becomes larger.

In addition, when the contact surface 16b of the first-stopper-receiving portion 16 and the contact surface 13b of the first stopper 13 come into contact with each other, the rotation angle of the hinge device 52, i.e., the rotation angle formed between the upper body 50 and the lower body 51, is regulated to be the maximum at an angle of, for example, 170 degrees.

Figure 18:
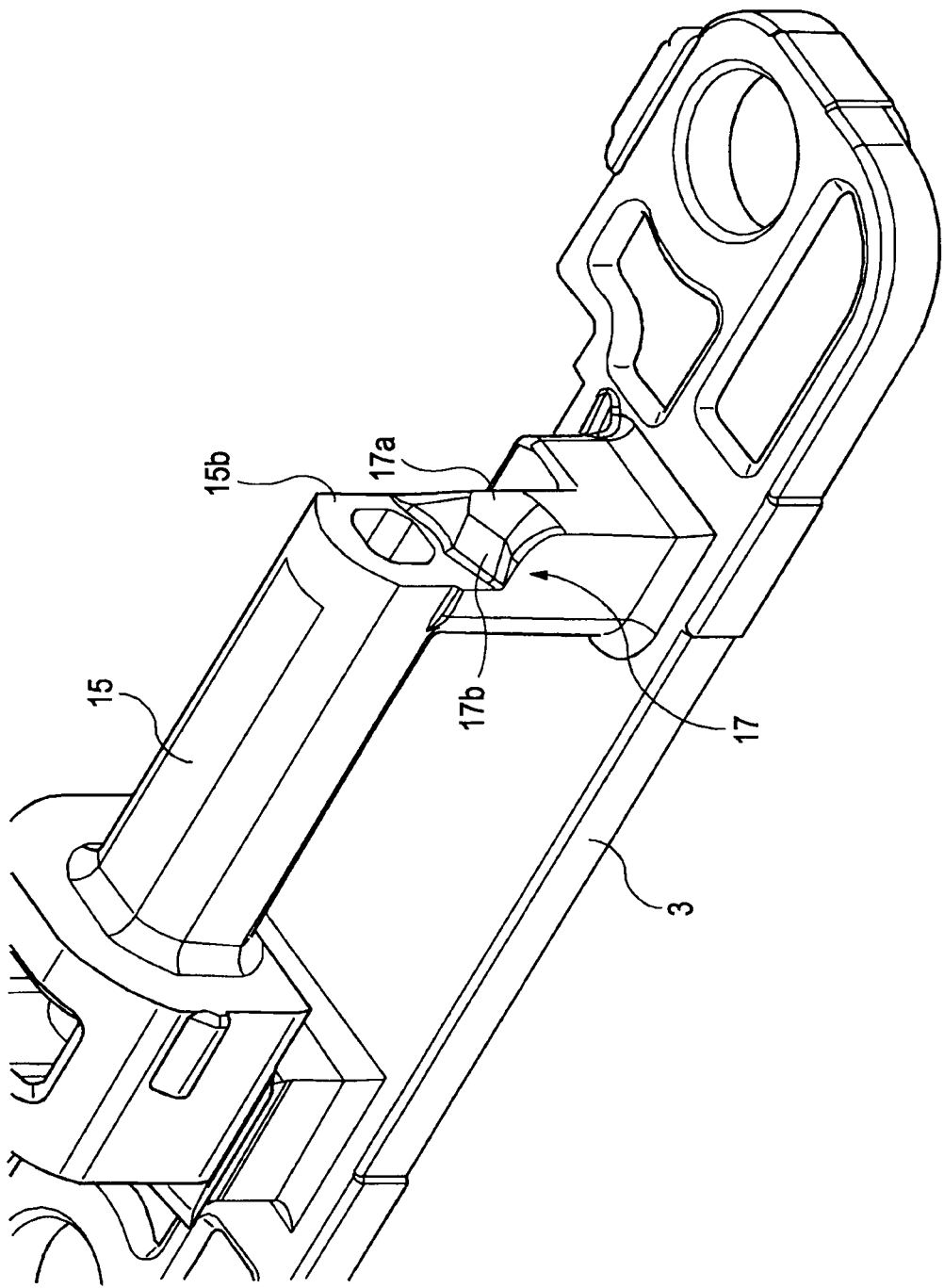
FIG. 18 is a diagram for describing a second-stopper-receiving portion provided on the second frame member.
Figure 19:
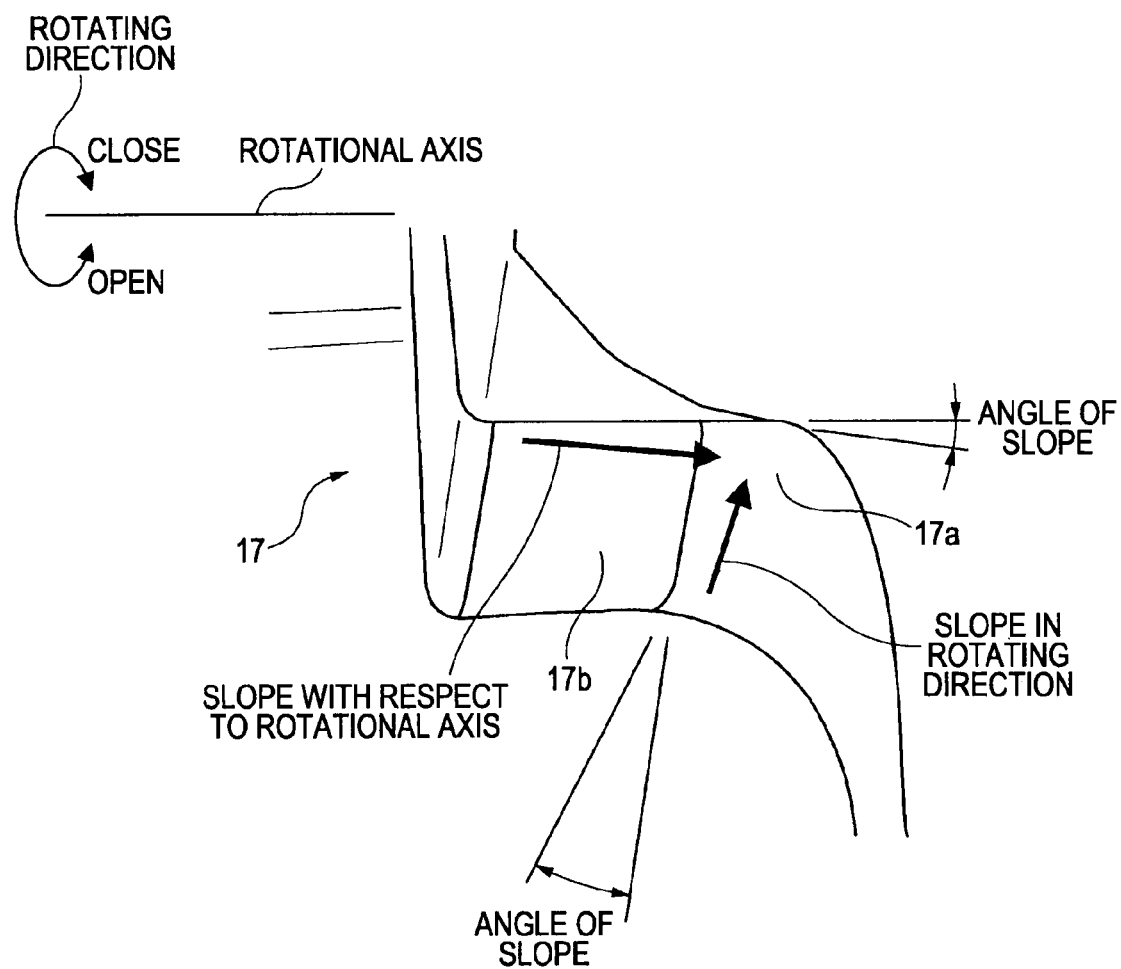
FIG. 19 is an enlarged view of the second-stopper-receiving portion provided on the second frame member.

On the other hand, the second-stopper-receiving portion 17 is also given a radius and is made to slope in substantially the same manner as in the case of the first-stopper-receiving portion 16. FIG. 18 is a perspective view of the second-stopper-receiving portion 17. FIG. 19 is an enlarged view of the second-stopper-receiving portion 17. As can be seen from FIGS. 18 and 19, an edge 17a of the second-stopper-receiving portion 17 is given such a radius as to form a predetermined curve. The radius given to the edge 17a of the second-stopper-receiving portion 17 corresponds to the radius given to the junction corner 14a of the second stopper 14. Therefore, the second stopper 14 and the second-stopper-receiving portion 17 are to be in contact with each other at the junction corner 14a and the edge 17a forming curves.

The second-stopper-receiving portion 17 has a contact surface 17b that is to be in contact with the contact surface 14b of the second stopper 14 shown in FIGS. 12 and 13. Referring to FIG. 19, the contact surface 17b is cut obliquely such that an end thereof near the edge 17a resides lower than the opposite end thereof away from the edge 17a, whereby the contact surface 17b is made to slope at an angle with respect to the rotational axis.

In addition to such a slope with respect to the rotational axis, the contact surface 17b of the second-stopper-receiving portion 17 is made to slope at another angle in the rotating direction of the rotational axis, as shown in FIG. 19. Specifically, the contact surface 17b is made to slope such that the contact surface 17b descends in a direction from an open-position side to a closed-position side.

That is, to redirect a load produced upon contact between the second stopper 14 of the second shaft-insertion section 7 and the contact surface 17b of the second-stopper-receiving portion 17 in such a direction that the thickness of the second shaft-insertion section 7 becomes larger, the contact surface 17b is made to slope at an angle with respect to the rotational axis and at another angle in the rotating direction. In short, the contact surface 17b of the second-stopper-receiving portion 17 is made to slope such that a load produced upon contact between the second stopper 14 of the second shaft-insertion section 7 and the contact surface 17b is applied in such a direction that the thickness of the second shaft-insertion section 7 becomes larger.

In addition, when the contact surface 17b of the second-stopper-receiving portion 17 and the contact surface 14b of the second stopper 14 come into contact with each other while the first stopper 13 and the first-stopper-receiving portion 16 also come into contact with each other, the rotation angle of the hinge device 52, i.e., the rotation angle formed between the upper body 50 and the lower body 51, is regulated to be the maximum at an angle of, for example, 170 degrees.

Figure 20:
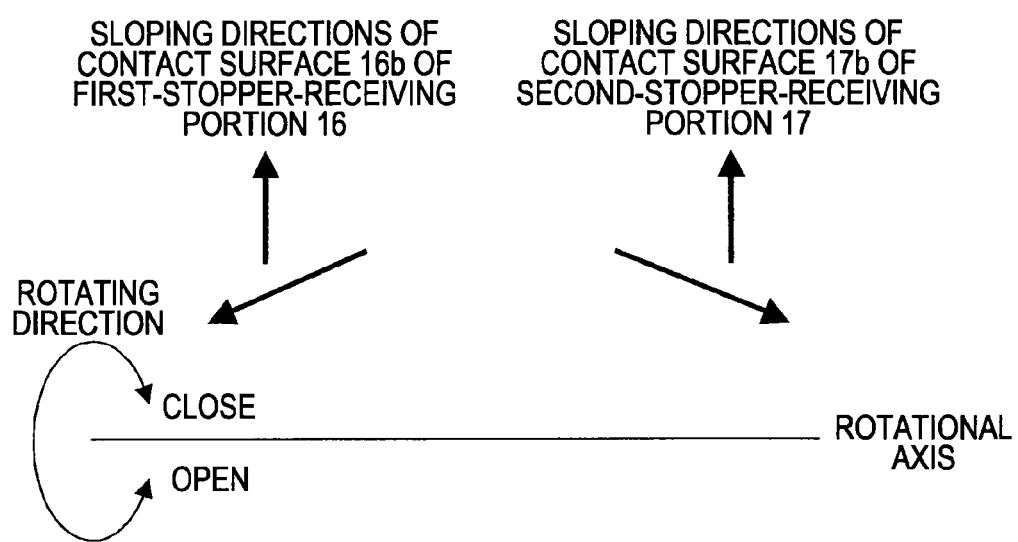
FIG. 20 is a diagram for describing sloping directions of the first-stopper-receiving portion and the second-stopper-receiving portion.

FIG. 20 shows the sloping directions of the contact surface 16b of the first-stopper-receiving portion 16 and the sloping directions of the contact surface 17b of the second-stopper-receiving portion 17. In FIG. 20, bold arrows indicate the sloping directions of the contact surfaces 16b and 17b. As can be seen from FIG. 20, the contact surface 16b and the contact surface 17b are made to slope at angles with respect to the rotational axis, in diverging directions. Further, the contact surface 16b and the contact surface 17b are made to slope at angles in the rotating direction in such a manner as to descend in a direction from the open-position side to the closed-position side.

The first stopper 13 of the first shaft-insertion section 6 and the second stopper 14 of the second shaft-insertion section 7 that are to be in contact with the contact surface 16b and the contact surface 17b, respectively, are made to slope in correspondence with the contact surface 16b and the contact surface 17b, respectively. Therefore, in the hinge device 52, when the first stopper 13 of the first shaft-insertion section 6 and the second stopper 14 of the second shaft-insertion section 7 come into contact with the contact surface 16b of the first-stopper-receiving portion 16 and the contact surface 17b of the second-stopper-receiving portion 17, respectively, loads produced upon such contacts are applied in respective directions in which the thicknesses of the first shaft-insertion section 6 and the second shaft-insertion section 7 become larger, as described below.

Process of Assembling Hinge Device

The process of assembling the hinge device 52 configured as above will now be described mainly with reference to FIG. 2. First, the spring 10 is inserted into the spring-receiving portion 11 (refer to FIG. 5) provided in the first shaft-insertion section 6 of the first frame member 2. In this state, referring to FIG. 6, the projections 12a and 12b of the cam member 12 are fitted into the recesses 18a and 18b provided in the one-end surface 6a of the first shaft-insertion section 6.

Subsequently, referring to FIG. 7, the cam member 30 into which the projections 12a and 12b of the cam member 12 are to be fitted is fixed to the rotation-shaft-supporting section 15. Then, the one-end surface 6a of the first shaft-insertion section 6 of the first frame member 2 is brought to face the one end 15a of the rotation-shaft-supporting section 15 of the second frame member 4, and the one-end surface 7a of the second shaft-insertion section 7 of the first frame member 2 is brought to face the other end 15b of the rotation-shaft-supporting section 15 of the second frame member 4, whereby the first frame member 2 is fitted to the second frame member 4.

In this state, a washer 19 is placed between a stationary cam member 20, provided on the second frame member 4, and the first shaft-insertion section 6. Then, the shaft member 5 is inserted into the stationary cam member 20, the shaft-insertion hole 8 provided in the first shaft-insertion section 6 of the first frame member 2, the shaft-insertion hole 18 provided in the rotation-shaft-supporting section 15 of the second frame member 4, and the shaft-insertion hole 9 provided in the second shaft-insertion section 7 of the first frame member 2, in that order. Lastly, a washer stopper 21 is attached to the stationary cam member 20 so that the shaft member 5 is fixed to the stationary cam member 20. Thus, the process of assembling the hinge device 52 is completed.

Function of Redirecting Contact Load Applied to Stopper in Larger-Thickness Direction As described above, in the hinge device 52 according to the embodiment, the first stopper 13 provided on the first shaft-insertion section 6 of the first frame member 2 comes into contact with the first-stopper-receiving portion 16 provided on the second frame member 4, and the second stopper 14 provided on the second shaft-insertion section 7 of the first frame member 2 comes into contact with the second-stopper-receiving portion 17 provided on the second frame member 4, whereby the rotation angle of the hinge device 52, i.e., the rotation angle formed between the upper body 50 and the lower body 51, is regulated to be the maximum at an angle of, for example, about 170 degrees. In this situation, as described below, loads applied to the first stopper 13 and the second stopper 14 upon such contacts are redirected in such directions that the thicknesses of the first stopper 13 and the second stopper 14 become larger.

This function of redirecting the loads will now be described, focusing on the contact between the first stopper 13 provided on the first shaft-insertion section 6 of the first frame member 2 and the first-stopper-receiving portion 16 provided on the second frame member 4.

As described with reference to FIGS. 9 and 10, the junction corner 13a of the first stopper 13 is given such a radius as to form a predetermined curve. As described with reference to FIGS. 16 and 17, the edge 16a of the first-stopper-receiving portion 16 that is to be in contact with the junction corner 13a of the first stopper 13 is also given a radius corresponding to the radius given to the junction corner 13a of the first stopper 13.

As described with reference to FIGS. 17 and 20, the contact surface 16b of the first-stopper-receiving portion 16 that is to be in contact with the contact surface 13b of the first stopper 13 is made to slope at an angle in the rotating direction in such a manner as to descend in a direction from the open-position side to the closed-position side. Further, as described with reference to FIGS. 5 and 20, the contact surface 13b of the first stopper 13 is made to slope in correspondence with the contact surface 16b of the first-stopper-receiving portion 16.

Therefore, in the hinge device 52, when the upper body 50 and the lower body 51 are opened, the first stopper 13 of the first shaft-insertion section 6 and the first-stopper-receiving portion 16 come into contact with each other at the junction corner 13a and the edge 16a, having the radii corresponding to each other, and at the contact surface 13b and the contact surface 16b, being sloped at angles corresponding to each other.

Figure 21A:
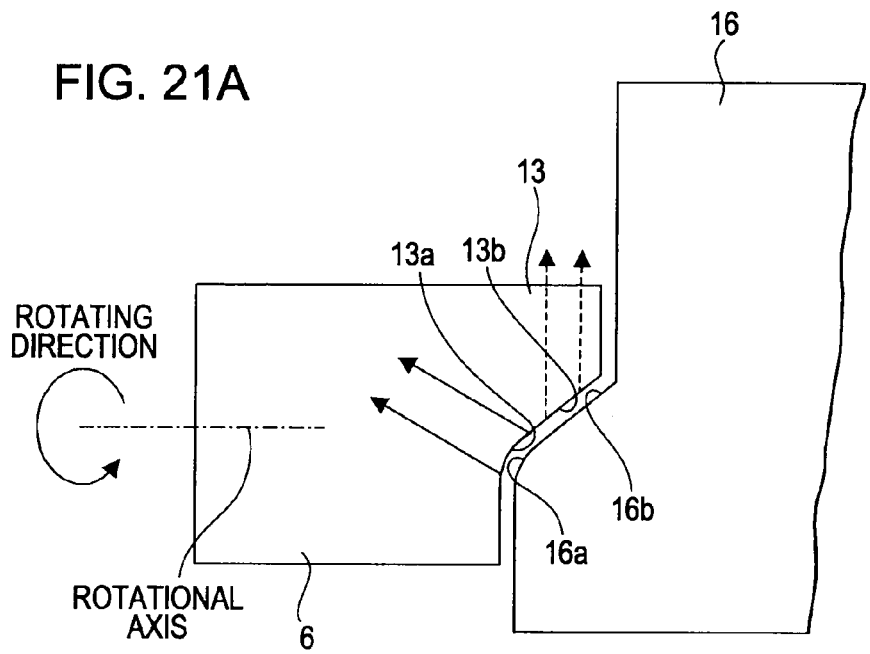
FIGS. 21A and 21B are diagrams for describing a function of redirecting a load applied to the hinge device.
Figure 21B:
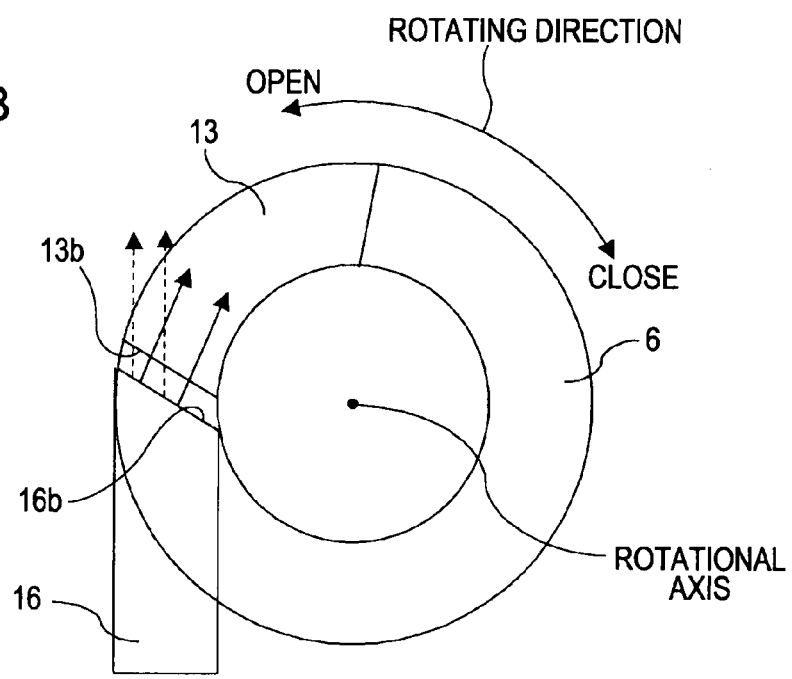
Figure 22A:
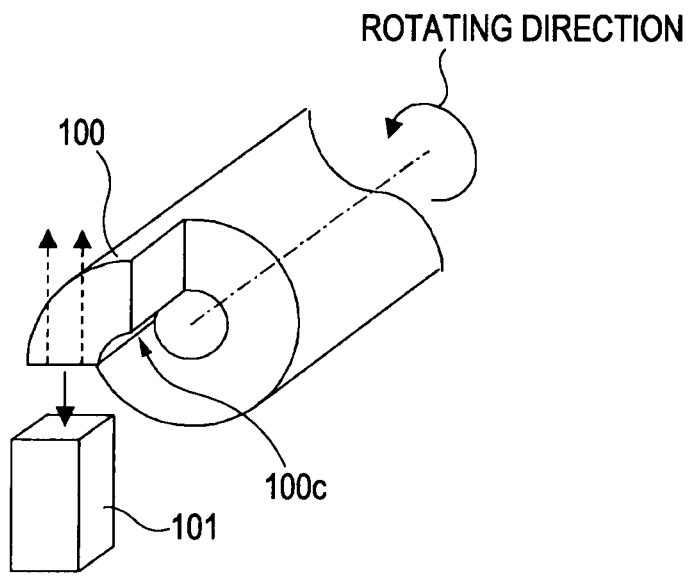
FIGS. 22A and 22B are diagrams for describing how a load is applied to a related-art hinge device.
Figure 22B:
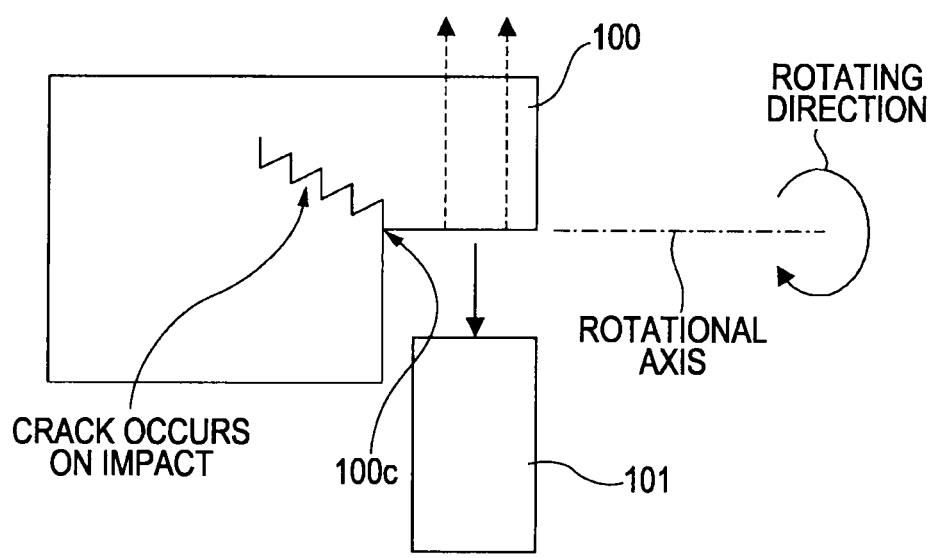

FIG. 21A is a cross-sectional view of the first stopper 13 and the first-stopper-receiving portion 16 that are in contact with each other, taken along the rotational axis. FIG. 21B is another cross-sectional view of the first stopper 13 and the first-stopper-receiving portion 16 that are in contact with each other, taken along the line orthogonal to the rotational axis.

As can be seen from FIG. 21A, in the state where the first stopper 13 and the first-stopper-receiving portion 16 are in contact with each other, the radii and the sloping angles with respect to the rotational axis effectively work, so that the contact load can be applied in such a direction that the thickness of the first shaft-insertion section 6 becomes larger, as indicated by solid arrows shown in FIG. 21A.

As can be seen from FIG. 21B, in the state where the first stopper 13 and the first-stopper-receiving portion 16 are in contact with each other, the radii and the sloping angles in the rotating direction effectively work, so that the contact load can be applied in such a direction that the thickness of the first shaft-insertion section 6 becomes larger, as indicated by solid arrows shown in FIG. 21B.

In other words, by sloping and giving radii to the first stopper 13 and the first-stopper-receiving portion 16, the load produced upon contact therebetween can be applied in a direction toward the inside of the first shaft-insertion section 6 having a larger thickness, that is, the load produced upon contact can be redirected in such a direction that the thickness of the first shaft-insertion section 6 becomes larger.

Dashed arrows shown in FIGS. 21A and 21B indicate a load that is supposed to be applied to the first stopper 13 upon contact between the first stopper 13 and the first-stopper-receiving portion 16 if the first stopper 13 and the first-stopper-receiving portion 16 are not given the radii and are not sloped in the manner described above. In this case, the load produced upon contact therebetween is applied in such a direction that the thickness of the first stopper 13 becomes smaller. Therefore, the first shaft-insertion section 6 is easily damaged.

In contrast, in the case of the hinge device 52 included in the mobile phone according to the embodiment, the load produced upon contact between the first stopper 13 and the first-stopper-receiving portion 16, which are given the radii and made to slope as described above, can be applied in such a direction that the thickness of the first shaft-insertion section 6 becomes larger. Therefore, the first shaft-insertion section 6 can be assuredly prevented from being damaged because of the contact between the two.

Naturally, the combination of the second stopper 14 provided on the second shaft-insertion section 7 of the first frame member 2 and the second-stopper-receiving portion 17 provided on the second frame member 4 also works effectively in the same manner and produces the same advantage as in the above-described case. Details have already been given above.

Advantages Produced by the Embodiment

As is obvious from the above description, the mobile phone according to the embodiment includes the hinge device 52, in which the junction corner 13a and the edge 16a, at which the first stopper 13 and the first-stopper-receiving portion 16 are in contact with each other, are given radii, and the contact surface 13b and the contact surface 16b, at which the first stopper 13 and the first-stopper-receiving portion 16 are in contact with each other, are made to slope at angles with respect to the rotational axis and in the rotating direction (the periphery direction). Likewise, the junction corner 14a and the edge 17a, at which the second stopper 14 and the second-stopper-receiving portion 17 are in contact with each other, are given radii, and the contact surface 14b and the contact surface 17b, at which the second stopper 14 and the second-stopper-receiving portion 17 are in contact with each other, are made to slope at angles with respect to the rotational axis and in the rotating direction (the periphery direction).

Thus, when the first stopper 13 and the first-stopper-receiving portion 16 comes into contact with each other, the contact load can be redirected in such a direction that the thickness of the first shaft-insertion section 6 becomes larger. Further, when the second stopper 14 and the second-stopper-receiving portion 17 comes into contact with each other, the contact load can be redirected in such a direction that the thickness of the second shaft-insertion section 7 becomes larger.

To summarize, the radii given to the junction corner 13a of the first stopper 13 and the edge 16a of the first-stopper-receiving portion 16 and the angles at which the contact surface 13b of the first stopper 13 and the contact surface 16b of the first-stopper-receiving portion 16 are made to slope together work to redirect the load produced upon contact between the first stopper 13 and the first-stopper-receiving portion 16 in such a direction that the thickness of the first shaft-insertion section 6 becomes larger. Likewise, the radii given to the junction corner 14a of the second stopper 14 and the edge 17a of the second-stopper-receiving portion 17 and the angles at which the contact surface 14b of the second stopper 14 and the contact surface 17b of the second-stopper-receiving portion 17 are made to slope together work to redirect the load produced upon contact between the second stopper 14 and the second-stopper-receiving portion 17 in such a direction that the thickness of the second shaft-insertion section 7 becomes larger.

In this fashion, the contact loads can be received by the first and second shaft-insertion sections 6 and 7, respectively, having large thicknesses. Therefore, sufficient strength can be provided. Moreover, even if the hinge device 52 is manufactured from inexpensive material, such as ABS resin, suitable for mass production and with a reduced size, the first and second stoppers 13 and 14 and the first- and second-stopper-receiving portions 16 and 17 can be assuredly prevented from being damaged by impact caused by dropping the phone and excessive opening of the phone including the hinge device 52.

The applicant of the present invention made a trial hinge device, with the diameter of the second shaft-insertion section 7 of the first frame member 2 designed to be 3.8 mm, and performed some tests using the trial hinge device to which the upper body 50 and the lower body 51 were secured to form a mobile phone. The tests included a drop endurance test with the mobile phone opened, and an endurance test in which the mobile phone is excessively opened. The tests showed good results in that the stoppers 13 and 14 and the stopper-receiving portions 16 and 17 were not damaged even when the phone was dropped from a position higher than specified and even when a force larger than specified was applied in the opening direction.

Modifications

Although the embodiment described above concerns the case where the present invention is applied to a hinge included in a foldable mobile phone, the present invention may alternatively be applied to a hinge included in any of other electronic apparatuses such as a PHS, a PDA, a portable game machine, a notebook personal computer, and the like. In any case, the same advantages as described above can be produced.

The present invention is not limited to the above embodiment described as an example, and various modifications and changes can be made thereto, in terms of design and the like, within the technical scope of the invention.

The present application contains subject matter related to that disclosed in Japanese Priority Patent Application JP 2008-144692 filed in the Japan Patent Office on Jun. 2, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A hinge device comprising:
    a first frame member having a securing section at which the first frame member is configured to be secured to a first body, the first frame member including a first shaft insertion section and a second shaft insertion section;
    a rotation shaft supporting the first frame member allowing rotation thereof;
    a stopper provided on the first frame member and contouring a portion of at least one recess in the first frame member in such a manner as to project in a direction in which the rotation shaft extends and to rotate together with the first frame member about the rotation shaft;
    a first cam member including at least one projection fitted into and secured by the at least one recess in the first frame member; and
    a second frame member, the second frame member including
        a securing section at which the second frame member is configured to be secured to a second body,
        a rotation-shaft-supporting section supporting the rotation shaft and disposed between the first shaft insertion section and the second shaft insertion section, and
        a stopper-receiving portion receiving the stopper,
    wherein the stopper and the stopper-receiving portion are rotatable into and out of contact with each other, such that a component of a load produced upon the stopper by the stopper-receiving portion is aligned with an axis of rotation to reduce damage to the stopper, and wherein the first and second frame members are not relatively axially displaceable.

2. The hinge device according to claim 1, wherein
    a junction corner between the first frame member and the stopper, and an edge of the stopper-receiving portion that is configured to contact the junction corner, have radii that form predetermined curves, respectively, so that the junction corner and the edge are configured to contact each other at the curves, and
    a contact surface of the stopper that is configured to contact the stopper-receiving portion, and a contact surface of the stopper-receiving portion that is configured to contact the contact surface of the stopper, are each made to slope by being cut obliquely at angles including an angle with respect to the direction in which the rotation shaft extends and an angle with respect to a rotating direction of the rotation shaft, so that the contact surfaces are configured to contact each other at the corresponding angles.

3. The hinge device according to claim 1, wherein the stopper and the stopper-receiving portion each include a plurality of pieces that are provided at predetermined intervals in the direction in which the rotation shaft extends.

4. A method of transferring a load applied to a hinge device, the hinge device including a first frame member having a securing section at which the first frame member is secured to a first body and rotating about a rotation shaft, and a second frame member having a securing section at which the second frame member is secured to a second body and a rotation-shaft-supporting section supporting the rotation shaft, the first frame member having a stopper contouring a portion of at least one recess in the first frame member and projecting in a direction in which the rotation shaft extends, a first cam member including at least one projection being fitted into and secured by the at least one recess in the first frame member, the second frame member having a stopper-receiving portion, the stopper and the stopper-receiving portion being rotatable into and out of contact with each other, whereby a rotation angle formed between the first and second bodies is regulated to be the maximum at a predetermined angle, the method comprising:

contacting the stopper with the stopper-receiving portion such that a load produced upon the stopper from the contact is transferred toward a direction in which a thickness of the stopper increases.

5. A mobile terminal apparatus comprising:
a first body;
a second body; and
a hinge device connecting the first body and the second body to each other allowing rotation thereof,
the hinge device including
a first frame member having a securing section at which the first frame member is configured to be secured to a first body, the first frame member including a first shaft insertion section and a second shaft insertion section;
a rotation shaft supporting the first frame member allowing rotation thereof;
a stopper provided on the first frame member and contouring a portion of at least one recess in the first frame member in such a manner as to project in a direction in which the rotation shaft extends and to rotate together with the first frame member about the rotation shaft;
a first cam member including at least one projection fitted into and secured by the at least one recess in the first frame member; and
a second frame member, the second frame member including
a securing section at which the second frame member is configured to be secured to a second body,
a rotation-shaft-supporting section supporting the rotation shaft and disposed between the first shaft insertion section and the second shaft insertion section, and
a stopper-receiving portion receiving the stopper,
wherein the stopper and the stopper-receiving portion are rotatable into and out of contact with each other, such that a component of a load produced upon the stopper by the stopper-receiving portion is aligned with an axis of rotation to reduce damage to the stopper, and wherein the first and second frame members are not relatively axially displaceable.

6. The hinge device according to claim 1, further comprising:
a second cam member secured to the rotation-shaft-supporting section,
wherein the at least one projection of the first cam member moves into and out of recesses of the second cam member as the first body and the second body are opened or closed relative to one another, to produce a tactile clicking.

7. The hinge device according to claim 1, wherein the stopper and the stopper-receiving portion contact at a predetermined angle between the first and second bodies which is no greater than 170°.

8. The hinge device according to claim 1, wherein the first frame member and the second frame member, including the stopper and the stopper-receiving portion, are made of a curable plastic material.

9. The method of transferring a load applied to a hinge device according to claim 4, wherein the contacting the stopper with the stopper-receiving portion occurs at the predetermined angle which is no greater than 170°.

10. The mobile terminal apparatus according to claim 5, wherein the hinge device further includes:
a second cam member secured to the rotation-shaft-supporting section,
wherein the at least one projection of the first cam member moves into and out of recesses of the second cam member as the first body and the second body are opened or closed relative to one another, to produce a tactile clicking.

11. The mobile terminal apparatus according to claim 5, wherein the stopper and the stopper-receiving portion contact at a predetermined angle between the first and second bodies which is no greater than 170°.

12. The mobile terminal apparatus according to claim 5, wherein the first frame member and the second frame member, including the stopper and the stopper-receiving portion, are made of a curable plastic material.

* * * * *